US009602896B2

(12) United States Patent
Vance et al.

(10) Patent No.: US 9,602,896 B2
(45) Date of Patent: Mar. 21, 2017

(54) WIRELESS METROLOGY COMMUNICATION

(71) Applicant: The Boeing Company, Chicago, IL (US)

(72) Inventors: Jonathan B. Vance, University City, MO (US); Ken Nguyen, Arnold, MO (US); Andrew J. Martignoni, III, Collinsville, IL (US); Eric E. Deck, Ladue, MO (US)

(73) Assignee: The Boeing Company, Chicago, IL (US)

( * ) Notice: Subject to any disclaimer, the term of this patent is extended or adjusted under 35 U.S.C. 154(b) by 158 days.

(21) Appl. No.: 14/569,570

(22) Filed: Dec. 12, 2014

(65) Prior Publication Data

US 2016/0173962 A1    Jun. 16, 2016

(51) Int. Cl.
*G08B 23/00*   (2006.01)
*G08C 15/06*   (2006.01)
(Continued)

(52) U.S. Cl.
CPC ............... *H04Q 9/00* (2013.01); *H04Q 9/02* (2013.01); *H04W 84/18* (2013.01)

(58) Field of Classification Search
CPC ............ H04Q 9/00; H04Q 9/02; H04W 84/18
(Continued)

(56) References Cited

U.S. PATENT DOCUMENTS 7,580,767 B2 * 8/2009 MacDonald ........... G05B 13/04
                                                             700/108
8,570,152 B2 * 10/2013 Fahley .................... H02J 17/00
                                                             244/119

(Continued)

FOREIGN PATENT DOCUMENTS

GR          1007406 B      9/2011
WO       2009147611 A2   12/2009

OTHER PUBLICATIONS

Kinney, Patrick, "ZigBee Technology: Wireless Control that Simply Works", Communications Design Conference, Oct. 2, 2003, 20 pages.

(Continued)

*Primary Examiner* — Nader Bolourchi
(74) *Attorney, Agent, or Firm* — Kolisch Hartwell, P.C.

(57) ABSTRACT

A method of communicating a gauge measurement may include receiving from a gauge a measurement signal representative of a measurement output by the gauge. The method may further include producing a communication signal including the received measurement. The method may further include wirelessly transmitting the communication signal according to a wireless network protocol. In some examples, a wireless metrology assembly may comprise an input/output controller operatively coupled to a first wireless network controller. The input/output controller may be configured to receive from a gauge a measurement signal representative of a measurement output by the gauge. The input/output controller may be configured to receive the (Continued)

measurement signal from the gauge when the wireless metrology assembly is operatively coupled to the gauge, and to produce a communication signal including the received measurement. The first wireless network controller may be configured to wirelessly transmit the communication signal according to a wireless network protocol.

21 Claims, 8 Drawing Sheets

(51) Int. Cl.
  *H04Q 9/00* (2006.01)
  *H04Q 9/02* (2006.01)
  *H04W 84/18* (2009.01)

(58) Field of Classification Search
  USPC .................................................... 340/870.02
  See application file for complete search history.

(56) References Cited

U.S. PATENT DOCUMENTS

| | | | | |
|---|---|---|---|---|
| 8,930,038 B2* | 1/2015 | Forbes, Jr. | ............. | G05B 19/02 340/870.02 |
| 2005/0001727 A1* | 1/2005 | Terauchi | ............. | A61B 5/0002 340/573.1 |
| 2009/0320653 A1* | 12/2009 | Coffland | ............. | B25B 23/1425 81/467 |
| 2011/0018686 A1* | 1/2011 | Fahley | ............. | H02J 17/00 340/10.1 |
| 2012/0304767 A1* | 12/2012 | Howard | ............. | A42B 3/046 73/504.03 |

OTHER PUBLICATIONS

Lewis, F. L. "Wireless Sensor Networks", Smart Environments: Technologies, Protocols, and Applications, 2004, 18 pages.
General Electric Company, CL5 Ultrasonic Precision Thickness Gauge, 2007, 4 pages.
ZigBee Alliance, "ZigBee Wireless Sensor Applications for Health, Wellness and Fitness", Mar. 2009, 15 pages.
Mitutoyo America Corporation, Measurement Data Wireless Communication Systems: U-WAVE, Bulletin No. 1991, Jul. 2010, 12 pages.
Mitutoyo America Corporation, High-Accuracy Digimatic Micrometer, Bulletin No. 2057, Jan. 2012, 2 pages.
Digi International Inc., XBee and XBee-PRO ZB: ZigBee Embedded SMT RF Modules for OEMs, 2010-2014, 2 pages.
Mitutoyo America Corporation, AOS Absolute Digimatic Caliper CD-AX/APX Series, Bulletin No. 2129, Feb. 2014, 4 pages.
Mitutoyo America Corporation, Digimatic Indicators for Peak-Value Hold, Calculation and Bore Gage Applications, Bulletin No. 2162, Aug. 2014, 2 pages.
European Patent Office, Extended European Search Report in European Patent Application No. 15198697.3-1855, dated Apr. 21, 2016, 7 pages.

* cited by examiner

WIRELESS METROLOGY COMMUNICATION

FIELD

This disclosure relates to industrial metrology. More specifically, the disclosed embodiments relate to systems and methods for wirelessly communicating gauge measurements and/or operation information.

INTRODUCTION

In some cases, manufactured parts, such as relatively large airplane skins, spars, and stringers, are measured (e.g., checked for tolerance off of computer numeric control (CNC) automation) with one or more gauges, which may be moved along the manufactured parts to take measurements at different locations. These gauges may be connected to a computer with relatively expensive data cables. Because the respective gauges are tethered to the computer by the associated data cables, the computer, gauges, and data cables are typically loaded onto a cart and moved along the part as the measurements are performed. However, the data cables may become significantly worn as a result, sometimes requiring costly replacement. Further, data transmitted from a gauge to the computer over the associated data cable generally corresponds to only a raw measurement taken on the part by the gauge. A human operator of the gauge generally must stay within close proximity to the computer to be able to accept or reject the transmitted data before it is included into an automated measurement recording system.

SUMMARY

Disclosed herein are various examples of systems and methods providing wireless metrology communication.

In one example, a method of communicating a gauge measurement may comprise receiving from a gauge a measurement signal representative of a measurement output by a gauge. The method may further comprise producing a communication signal including the received measurement, and wirelessly transmitting the communication signal according to a wireless network protocol.

In another example, a wireless metrology assembly may comprise an input/output controller and a first wireless network controller. The first wireless network controller may be operatively coupled to the input/output controller. The input/output controller may be configured to receive from a gauge a measurement signal representative of a measurement output by the gauge. The input/output controller may be configured to receive the measurement signal from the gauge when the wireless metrology assembly is operatively coupled to the gauge. The input/output controller may be further configured to produce a communication signal including the received measurement. The first wireless network controller may be configured to wirelessly transmit the communication signal according to a wireless network protocol.

In some embodiments, the wireless metrology assembly may be included in a wireless metrology system. The wireless metrology system may further include a storage device, a wireless base adapter, and a computer. The wireless base adapter may be configured to wirelessly receive the transmitted communication signal. The computer may be configured to receive the communication signal from the wireless base adapter, to determine the measurement from the communication signal, and to store the determined measurement on the storage device.

In another example, a wireless metrology system may include a wireless metrology assembly, a display device, and a base assembly. The wireless metrology assembly may have at least one input device configured to receive an indication relating to a measurement. The indication may be manually entered on the input device and may correspond to at least one of a plurality of inputs selectable by a user. When the wireless metrology assembly is operatively coupled to a gauge, the wireless metrology assembly may be configured to receive from the gauge a measurement signal representative of a measurement output by the gauge. The wireless metrology assembly may be further configured to wirelessly transmit a communication signal representative of the measurement signal, and to wirelessly transmit a feedback signal representative of the entered indication. The display device may be configured to display a display signal. The base assembly may be configured to wirelessly receive the transmitted communication signal, to communicate to the display device the display signal including an indication of the measurement output by the gauge, and to wirelessly receive the feedback signal.

Features, functions, and advantages may be achieved independently in various embodiments of the present disclosure, or may be combined in yet other combinations, further details of which can be seen with reference to the following description and drawings.

DESCRIPTION

Overview

Figure 1:
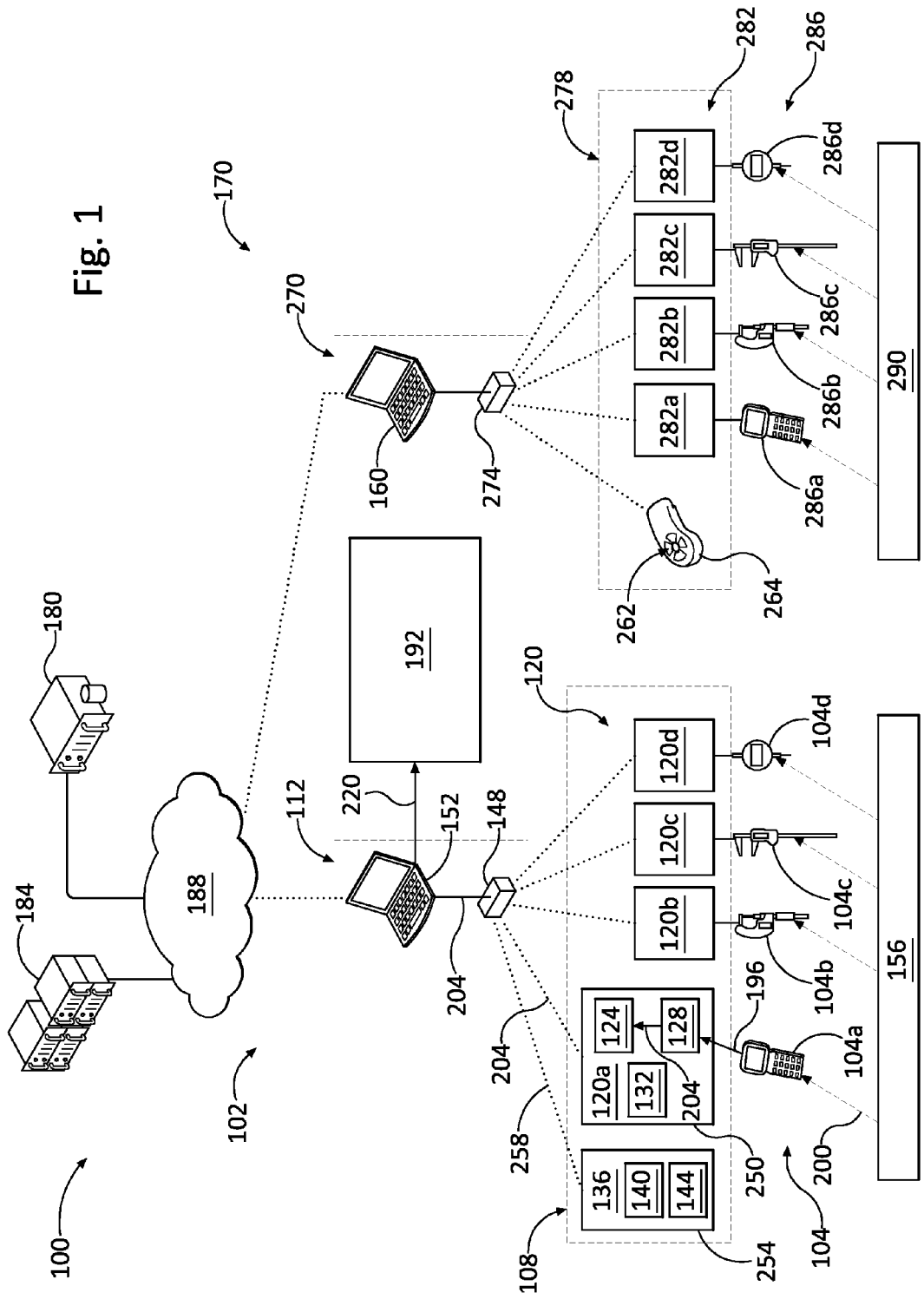
FIG. 1 is a general diagram of an example of a wireless metrology system.

Various embodiments are described below and illustrated in the associated drawings. Unless otherwise specified, an embodiment and/or its various components may, but are not required to, contain at least one of the structure, components, functionality, and/or variations described, and/or illustrated herein. Furthermore, the structures, components, functionalities, and/or variations described, and/or illustrated herein in connection with the present teachings may be, but are not required to be, included in other similar embodiments. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Disclosed systems may address management of end devices from a central console (e.g., base assembly), may provide encrypted wireless communication, and may have adaptable data formats and streams. More specifically, disclosed herein are systems and methods which may consolidate management of wireless gauges in a manufacturing environment, and/or eliminate a need for wires and/or multiple users for transmission/reception of gauge wireless signals. In some embodiments, a system may include one or more wireless device adapters based on a ZigBee or other wireless network protocol. The system may be configured to allow such device adapters to be operated in conjunction with measurement execution at different positions on large parts. The device adapters may combine a microcontroller to process gauge measurements, a wireless subsystem supporting ZigBee network protocol over an Institute of Electrical and Electronic Engineers IEEE 802.15.4 wireless communication standard, and a human interface for accepting and/or rejecting data over a long distance.

For example, disclosed embodiments may include ZigBee based adapters to accept wireless measurement signals from any wireless gauge, regardless of a native communication protocol of the gauge. More specifically, a wireless adapter based on the ZigBee specification may perform a bitwise conversion of gauge data from any wireless gauge independent of the native protocol of the gauge. The wireless adapter may be configured to encrypt the gauge data. In some embodiments, the system may permit the configuration of firmware to include metadata and/or device association.

In some embodiments, the system may be controllable via a central piece of software (e.g., a wireless-adapter management software application) running on a computer. The software may read base station identifiers (IDs) (e.g., an identification number of a wireless base adapter connected to the computer), scan a local network, and/or manage individual device configurations and/or firmware versions. In some embodiments, disclosed systems may include a wireless accept/reject input device (e.g., a wireless feedback device) to enable an operator to be fully mobile while still maintaining a capability to remotely accept/reject measurement inputs from positions spaced from the base station. Communicated measurements may be displayed, and in some examples may be viewed, for example, on a large format display, from different positions along manufactured parts.

The wireless adapters (or devices) may specifically utilize a ZigBee-Pro standard protocol, which is backwards-compatible with previous ZigBee standards, to realize encrypted wireless communications with authenticated transmissions. In some embodiments, a wireless adapter may include a network stack configured to transmit (and re-transmit, for example, if reception acknowledgement is not received) gauge readings along with salient metadata, process, identification number, and/or calibration date related to the gauge.

More specifically, the system may be configurable by the software to manage gauges that are wirelessly connected to a wireless base station device (e.g., the wireless base adapter) that is connected to the computer. The software may have a set of options (and/or functions) to manage gauge networks. The options may permit an operator to (a) set up a network coordinator device (e.g., the wireless base adapter); (b) test a gauge network; (c) transfer a gauge to another gauge network; and/or (d) update gauge firmware (e.g., update firmware of a wireless gauge adapter). In one firmware configuration, the system may capture and send raw measurement data only to the wireless base adapter connected to the computer. In another firmware configuration, the system may append metadata, such as an associated gauge number, to the measurement data. In another firmware configuration, the system may send raw RS-232 messages. In another firmware configuration, the system may process non-standard serial protocols, such as the Mitutoyo Digimatic protocol, and send the processed non-standard serial protocols to the computer.

In some embodiments, a base station network coordinator (e.g., the wireless base adapter) connected to the computer may send gauge data to the computer over a COM port using a USB serial port driver, such as an (FTDI) USB serial port driver. While measurement data may be securely sent from the wireless gauge adapters to the wireless base adapter over a wireless link using 128-bit (AES) encryption, a payload (e.g., including the measurement data) sent over a wired USB link (e.g., between the wireless base adapter and the computer) may not be encoded or encrypted. For devices (e.g., gauges) which are designed to operate with a RS-232 connection, the wireless link may be completely transparent. For devices (e.g., gauges) that have non-standard protocols, firmware (e.g., included in a current configuration of the wireless gauge adapter) may process gauge output into a human-readable form, which is what may arrive on the communication (COM) port of the computer (e.g., via transmission over the wireless link from the wireless gauge adapter to the wireless base adapter, and transmission over the wired link from the wireless base adapter to the COM port).

In some embodiments, a base station network coordinator (e.g., the wireless base adapter) connected to the computer may send gauge data to the computer over a COM port using a universal serial bus (USB) serial port driver, such as a Future Technology Devices International (FTDI) USB serial port driver. While measurement data may be securely sent from the wireless gauge adapters to the wireless base adapter over a wireless link using 128-bit advanced encryption standard (AES) encryption, a payload (e.g., including the measurement data) sent over a wired USB link )e.g., between the wireless base adapter and the computer) may not be encoded or encrypted. For devices (e.g., gauges) which are designed to operate with a RS-232 connection, the wireless link may be completely transparent. For devices (e.g., gauges) that have non-standard protocols, firmware (e.g., included in a current configuration of the wireless gauge adapter) may process gauge output into a human-readable form, which is what may arrive on the communication (COM) port of the computer (e.g., via transmission over the wireless link from the wireless gauge adapter to the wireless base adapter, and transmission over the wired link from the wireless base adapter to the COM port).

In one embodiment, a wireless metrology adapter (e.g., a wireless gauge adapter) may comprise an XBee microprocessor made by Digi International Inc. of Minnetonka, Minn., U.S.A. (or other ZigBee protocol microprocessor) and a circuit board. The circuit board may have a ZigBee Pro (or other ZigBee protocol) radio module, a general purpose input/output (IO) microcontroller, a rechargeable power source, a power source, and a sleep function.

Disclosed systems may acquire and wirelessly transmit measurement data from gauges which use RS-232 communication, and also from other gauges which use different communication protocols. In some embodiments, disclosed systems may handle baud rates of up to 115200 kbps from one or more gauges.

Wireless device (or gauge) adapters in disclosed systems may be configured to have significant battery life. For example, when a user selects a firmware that provides a heartbeat indication to show connectivity status, disclosed systems may permit 30,000 readings in a period of about two weeks before requiring a recharge of a lithium-ion polymer battery (or other power source) included in the associated adapter.

In some embodiments, disclosed systems may provide for connectivity of up to 10 wireless adapters per base station, for example, with low power end device modem firmware. In some embodiments, router modem firmware may be installed on the devices, but in some cases, at the expense of battery life. Also, in a ZigBee wireless base station embodiment, the ZigBee wireless base station may be connected to the computer via a USB interface, which may only limit a quantity of connected base stations determined by how many USB devices and COM ports the computer hardware and operating system can handle. In some embodiments, wireless gauge adapters may communicate with an associated base station adapter up to distances of 100 meters (e.g., line-of-sight), and such communication may be resilient in the presence of large metallic objects (or parts), such as large aluminum wing skins and spars, thereby providing for improved measurement collection in aerospace manufacturing environments, among others.

Aspects of various embodiments may be embodied as a computer method, computer system, or computer program product. Accordingly, aspects of embodiments may take the form of an entirely hardware embodiment, an entirely software embodiment (including firmware, resident software, micro-code, and the like), or an embodiment combining software and hardware aspects, all of which may generally be referred to herein as a "circuit," "module," "adapter," or "system." Furthermore, aspects of embodiments may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of embodiments may be written in one or any combination of programming languages, including an object-oriented programming language such as Java, Smalltalk, C++, and/or the like, and conventional procedural programming languages, such as the C programming language. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of embodiments are described below with reference to flow chart illustrations and/or block diagrams of methods, apparatuses, systems, and/or computer program products. Each block and/or combination of blocks in a flow chart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flow chart and/or block diagram block or blocks.

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks.

Any flow chart and/or block diagram in the drawings is intended to illustrate the architecture, functionality, and/or operation of possible implementations of systems, methods, and computer program products according to aspects of various embodiments. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

EXAMPLES, COMPONENTS, AND ALTERNATIVES

The following examples describe selected aspects of exemplary embodiments, as well as related systems and/or methods. These examples are intended for illustration and should not be interpreted as limiting the scope of the present disclosure. Each example may include one or more distinct inventions, and/or contextual or related information, function, and/or structure.

Example 1

This example describes a wireless metrology system 100 and related methods and operations; see FIGS. 1-8.

As shown in FIG. 1, system 100 may include one or more wireless transmission subsystems, such as a first subsystem 102. Subsystem 102 may include one or more gauges 104 (or other similar devices), such as gauges 104a-d, a wireless metrology assembly 108, and a base assembly 112. Gauge 104a may be an ultrasonic thickness gauge, such as model CL5 produced by General Electric Company of Fairfield, Conn., United States of America (U.S.A.). Gauge 104b may be a digital micrometer. Gauge 104c may be a digital caliper. Gauge 104d may be a digital dial indicator. Examples of these latter three gauges are sold by Mitutoyo America Corporation of Aurora, Ill., U.S.A. However, in other embodiments, other measurement taking and/or digital gauges may be used.

Wireless metrology assembly 108 may include one or more gauge adapters 120, such as gauge adapters 120a-d, which are schematically depicted here in FIG. 1. Each of gauge adapters 120a-d may include a wireless network controller, an input/output controller, and a metrology storage device. For example, adapter 120a is shown as including a wireless network controller 124, an input/output controller 128, and a metrology storage device 132. Wireless metrology assembly 108 may further include a wireless feedback device 136. Device 136 may include another wireless network controller 140 and a user-input device 144. As is described further below, base assembly 112 may include a wireless base adapter 148 and a computer 152, such as a hardened laptop.

In general, one or more of gauges 104 may be operated (e.g., manually by a human user or operator) to measure one or more parts, such as a manufactured part 156. Gauges 104 may output measurements to the associated gauge adapter of assembly 108, which may produce respective communication signals. The associated gauge adapter may wirelessly transmit the respective communication signal to base adapter 148, for example, according to a wireless network protocol, such as a ZigBee network protocol having an IEEE 802.15.4 wireless communication standard. Base adapter 148 may wirelessly receive the transmitted communication signal(s), and output the communication signal(s) to a RS-232 COM port (or other input port, such as a USB keyboard interface) of computer 152. Computer 152 (and/or base adapter 148) may determine the measurement(s) of part 156 from the received communication signal(s). Computer 152 (and/or base adapter 148) may be configured to store the determined measurement(s) on a first storage device. In some embodiments, the first storage device may be a storage device of computer 152 (e.g., an associated hard drive), a storage device associated with another computer of another subsystem (e.g., a hard drive of a computer 160 of a second subsystem 170 of system 100, which will be described further below in more detail), and/or a storage device associated with an inter-computer network (e.g., a database 180 and/or a server 184 associated with an intranet 188, which may be an enterprise or company intranet, an extranet, or a wide-area network). For example, in some embodiments, the first storage device may be a distributed storage device, while in other embodiments the first storage device may be a local storage device.

In some embodiments, computer 152 may output a display signal representative of a measurement output by a gauge to a display (or display device), such as that of computer 152 and/or a large format display 192. The operator (e.g., of the gauge, or another human operator) may view the display signal on the display, and input a user-input to wireless feedback device 136 via operation of user-input device 144. Wireless network controller 140 may wirelessly transmit a feedback signal representative of the user input to base adapter 148. Base adapter 148 may receive the transmitted feedback signal, and output the transmitted feedback signal to computer 152. Computer 152 may process the associated determined measurement based at least in part on the received feedback signal. For example, if the operator determines that the measurement represented by the displayed display signal is acceptable (e.g., accurate), then the operator may use feedback device 136 to send an accept feedback signal to base adapter 148. Based on such an accept feedback signal, computer 152 may store the measurement in the first storage device.

Specifics regarding structure and operation of gauge adapter 120a in conjunction with other components of system 100 will now be described in more detail. The other gauge adapters of system 100 may be structured and operate within system 100 in a similar manner as gauge adapter 120a, and as such, the description related to gauge adapter 120a may be similarly and/or suitably applied to the other gauge adapters.

In particular, wireless network controller 124 may be operatively coupled to input/output controller 128. Input/output controller 128 may be configured to receive a measurement signal 196 from gauge 104a when assembly 108 (e.g., adapter 120a) is operatively coupled to gauge 104a. For example, assembly 108 may be operatively coupled to gauge 104a when a data link is established there between. In particular, the established data link may be a wired connection between input/output controller 128 and an output port of gauge 104a, while in other examples the data link may include a wireless connection. Measurement signal 196 may be representative of a measurement 200 collected and/or output by gauge 104a, such as a thickness of a portion of part 156. Input/output controller 128 may be configured to produce a communication signal 204 (e.g., based at least in part on measurement signal 196). Communication signal 204 may include received measurement 200 (e.g., data representative thereof). Input/output controller 128 may be configured to output communication signal 204 to wireless network controller 124. Wireless network controller 124 may be configured to wirelessly transmit communication signal 204 according to a wireless network protocol. As mentioned above, the wireless network protocol may be a ZigBee network protocol according to an IEEE 802.15.4 wireless communication standard, for example, having a 128-bit advanced encryption standard (AES) and a 64-bit network ID.

Wireless base adapter 148 may be configured to wirelessly receive transmitted communication signal 204 from wireless network controller 124. Computer 152 may be configured to receive communication signal 204 from wireless base adapter 148. Computer 152 may be configured to determine measurement 200 from received communication signal 204. Computer 152 may be configured to store determined measurement 200 on the first storage device. For example, computer 152 may be configured to transmit an encrypted message including measurement 200 to server 184 and/or database 180 via intranet 188. For example, computer 152 may be connected to intranet 188 via a wireless data link having an IEEE 802.11 wireless Wi-Fi protected Access II (WPA2)-Enterprise encryption. Server 184 and/or database 180 may (or may be used to) store and/or process part measurement data and/or as-built data for part 156, among others, which may permit statistical process control data collection and/or analysis.

In some embodiments, storage device 132 may be configured to store one or more gauge-specific data, and input/output controller 128 may be configured to produce communication signal 204 with at least one of the one or more gauge-specific data. For example, storage device 132 may be configured to store metadata related to the gauge, such as gauge-type, a process associated with the gauge, an identification number of the gauge, a calibration of the gauge, and/or other salient gauge metadata.

In some embodiments, gauge 104a may be configured to output measurement signal 196 with measurement 200 formatted according to a first format of a plurality of formats. The plurality of formats may correspond respectively to different formats associated with different suitable gauge, gauge adapter, and/or metadata transmission configurations. For example, the first format associated with gauge 104a may correspond to a raw measurement output in a non-standard serial protocol. In such embodiments, among others, input/output controller 128 may be configured to generate communication signal 204 with measurement 200 formatted according to a second format of the plurality of formats. For example, the second format may correspond to a standardized serial protocol (e.g., configured to be transmitted over an RS-232 connection), and/or raw measurement 200 with one or more of the gauge-specific data described above appended thereto. Such reformatting of measurement signal 196 by input/output controller 128 may permit system 100 to wirelessly transmit measurements from various gauges, and input those measurements into computer 152 regardless of differences between the native protocols of the respective gauges. Further, the appended metadata may permit for improved statistical process control and analysis, such as identifying measurements from recently calibrated gauges. Such re-formatting of measurement signals by gauge adapter 120a, among other operations, may be controlled and/or implemented by firmware installed thereon, which may be wirelessly updated by system 100, as will be described further below in more detail.

To provide for further improvement of measurement collection, display device 192 (e.g., a large format display) may be operatively coupled to computer 152. As mentioned above, display device 192 may be configured to display a display signal received from computer 152. For example, computer 152 may be configured to output to display device 192 a display signal 220 representative of measurement 200 output by gauge 104a. Display device 192 may be configured to receive display signal 220, and display (e.g., visually) display signal 220, for example, such that the operator can view data representative of measurement 200 from a remote location of assembly 108.

Such a configuration may permit the operator to move around part 156, and/or accept/reject measurement 200, without having to be proximate one or more of computer 152, gauge adapter 120a, and display device 192, which may enable improved agility when performing quality assurance and/or statistical process control data collection. For example, as schematically depicted in FIG. 1, gauge adapter 120a may include a first housing 250. Housing 250 may support input/output controller 128, wireless network controller 124, and storage device 132. As also schematically depicted in FIG. 1, wireless feedback device 136 may include a second housing 254. Second housing 254 may be physically separate from and independently movable relative to first housing 250. Second housing 254 may support user-input device 144 and wireless network controller 140. As mentioned above, user-input device 144 may be configured to receive a user input corresponding to one of a plurality of inputs selectable by the user (e.g., the operator) that relate to measurement 200 displayed on display device 192. Wireless network controller 140 may be configured to wirelessly transmit a feedback signal 258 representative of the user input to computer 152 via wireless base adapter 148.

In particular, the plurality of inputs of wireless feedback device 136 (e.g., included in user-input device 144) may include a plurality of user-operable buttons, similar to a plurality of buttons 262 shown coupled to a housing of a wireless feedback device 264 of second subsystem 170. For example, user-input device 144 may include an accept button and a reject button. In some embodiments, one or more of wireless feedback devices 136, 264 may be a HID keyboard input wireless device. For example, the accept button of user-input device 144 may correspond to a "Y" wireless keyboard input (or other suitable affirmation character or accept signal), and the reject button of user-input device 144 may correspond to an "N" wireless keyboard input (or other suitable negation character or reject signal). As such, user-input device 144 may permit wireless feedback device 136 to receive an indication (e.g., from the user) relating to a measurement (e.g., measurement 200).

For example, the indication may be manually entered on user-input device 144 and may correspond to at least one of the plurality of inputs (e.g., similar to inputs or buttons 262) selectable by the user. Accordingly, as similarly described above, wireless metrology assembly 108 (e.g., gauge adapter 120a) may be configured to receive measurement signal 196 from gauge 104a, which may be representative of measurement 200 output by gauge 104a. Wireless metrology assembly 108 (e.g., gauge adapter 120a) may be further configured to wirelessly transmit communication signal 204 representative of measurement signal 196. Base assembly 112 may be configured to wirelessly receive transmitted communication signal 204 (e.g., via base adapter 148). Display signal 220 (e.g., generated by computer 152 based at least in part on received communication signal 204) may include an indication of measurement 200 output by gauge 104a. Base assembly 112 (e.g., computer 152) may be configured to communicate display signal 220 to display device 192. Wireless metrology assembly 108 (e.g., feedback device 136) may be configured to wirelessly transmit feedback signal 258 representative of the entered indication (e.g., representative of which input was selected by the user on user-input device 144). Base assembly 112 (e.g., base adapter 148) may be configured to wireless receive feedback signal 258. As similarly described above, wireless feedback device 136 may be physically separate from and independently movable relative to gauge adapter 120a. Such a configuration may improve an ergonomic efficiency of quality assurance and/or statistical process control data collection (e.g., collecting and accepting/rejecting measurements of part 156, among others).

As also previously mentioned, system 100 may include one or more additional wireless subsystems, such as second subsystem 170. Each of these additional subsystems may include a base assembly (e.g., similar to base assembly 112), and a wireless metrology assembly (e.g., similar to wireless metrology assembly 108). For example, second subsystem 170 is shown in FIG. 1 as including a base assembly 270 comprising computer 160 and a wireless base adapter 274, and a wireless metrology assembly 278 comprising wireless feedback device 264 and a plurality of gauge adapters 282*a-d* connected to a plurality of gauges 286*a-d*. Gauges 286 may be operated to measure part 156 and/or another part, such as an additional manufactured part 290.

In some embodiments, one or more of the gauge adapters 282 (e.g., and the associated one or more gauges) of system 100 may be interchanged between (or added to one or more of) the subsystems. In such embodiments, among others, system 100 may be configured to permit a network identification of one or more gauge adapters to be identified and linked to a particular wireless base adapter, as will be described in more detail further below.

In some embodiments, one or more of the gauge adapters of system 100 may be interchanged between gauges and/or connected to a new gauge, among other reconfigurations. In such embodiments, among others, firmware of the associated one or more gauge adapters may be updated via a wireless transmission from an associated base adapter, as will also be described below in more detail.

In some embodiments, display signals from different subsystems may be displayed (e.g., concurrently) on display 192. However, in some embodiments, one or more of the subsystems may have a dedicated display on which the associated display signals are displayed (e.g., such as a 60" flat panel display, or other relatively large format display suitable for visual verification of measurements by the user from a distance).

In some embodiments, the dedicated display may be separate from the associated wireless feedback device, such as device 136, may be from display device 192 in FIG. 1. However, in some embodiments, one or more of the displays may be included in one or more associated wireless feedback devices. For example, display 192 may be relatively small and may be coupled to housing 254. Further, in some embodiments, one or more of the wireless metrology assemblies may include a plurality of wireless feedback devices indexed with an associated plurality of gauge adapters, and may be housed in a common housing with integrated functionality.

Figure 2:
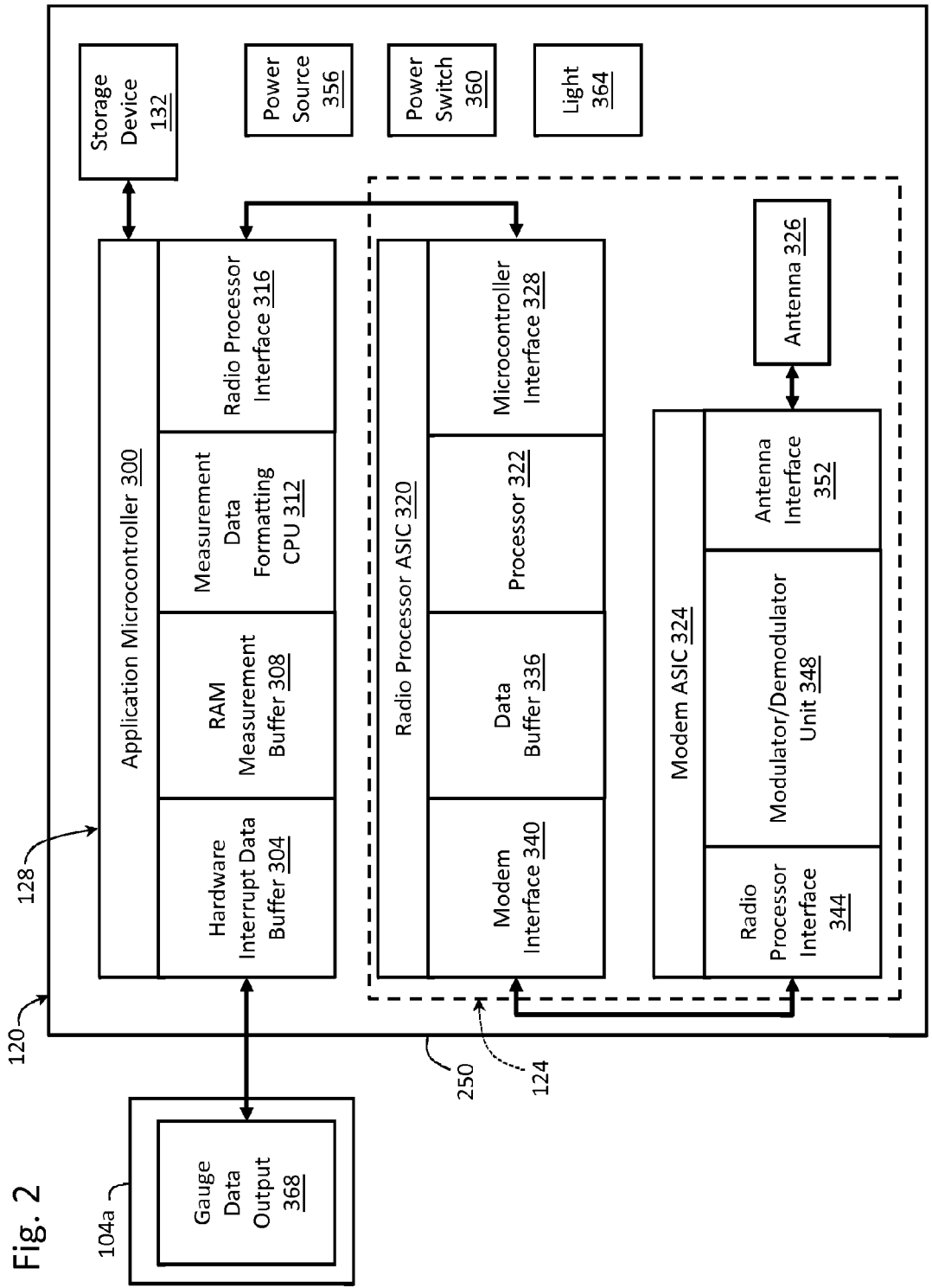
FIG. 2 is a detailed block diagram of an example of a wireless gauge adapter usable in the system of FIG. 1.

Exemplary aspects of system 100 will now be described in greater detail. In particular, FIG. 2 depicts a more detailed block diagram of an exemplary gauge adapter 120. For example, input/output controller 128 may include an application microcontroller 300 having a hardware interrupt data buffer 304, a RAM measurement buffer 308, a central processing unit (CPU) (or processor) 312 for formatting measurement data, and a radio processor interface 316. Wireless network controller 124 may include a radio processor application-specific integrated circuit (ASIC) 320, a modem ASIC 324, and an antenna 326. Radio processor ASIC 320 may include a microcontroller interface 328, a processor 332 for encoding/decoding digital wireless packets (or frames), a data buffer 336, and a modem interface 340. Modem ASIC 324 may include a radio processor interface 344, a modulator/demodulator unit 348, and an antenna interface 352. Gauge adapter 120*a* may further include a (rechargeable) power source 356, a power switch 360, and a light 364.

Power source 356 may be configured to supply electrical power to circuitry of gauge adapter 102, such as microcontroller 300, radio processor ASIC 320, modem ASIC 324, storage device 132, and light 364, for example, when power switch 360 is operated to an ON state from an OFF state. Power source 356 may be configured to be recharged, for example, via a USB port of gauge adapter 120.

Buffer 304 of microcontroller 300 may be coupled to a gauge data output 368 of gauge 104 (e.g., via a suitable interface). Radio processor interface 316 may be coupled to microcontroller interface 328. Modem interface 340 may be coupled to radio processor interface 344. Antenna interface 352 may be coupled to antenna 326. Light 364 may be coupled to microcontroller 300 and may be controlled to emit a visual signal to the user indicating a network ID of gauge adapter 120, for example, when so requested, which will be described further below in more detail.

Figure 3:
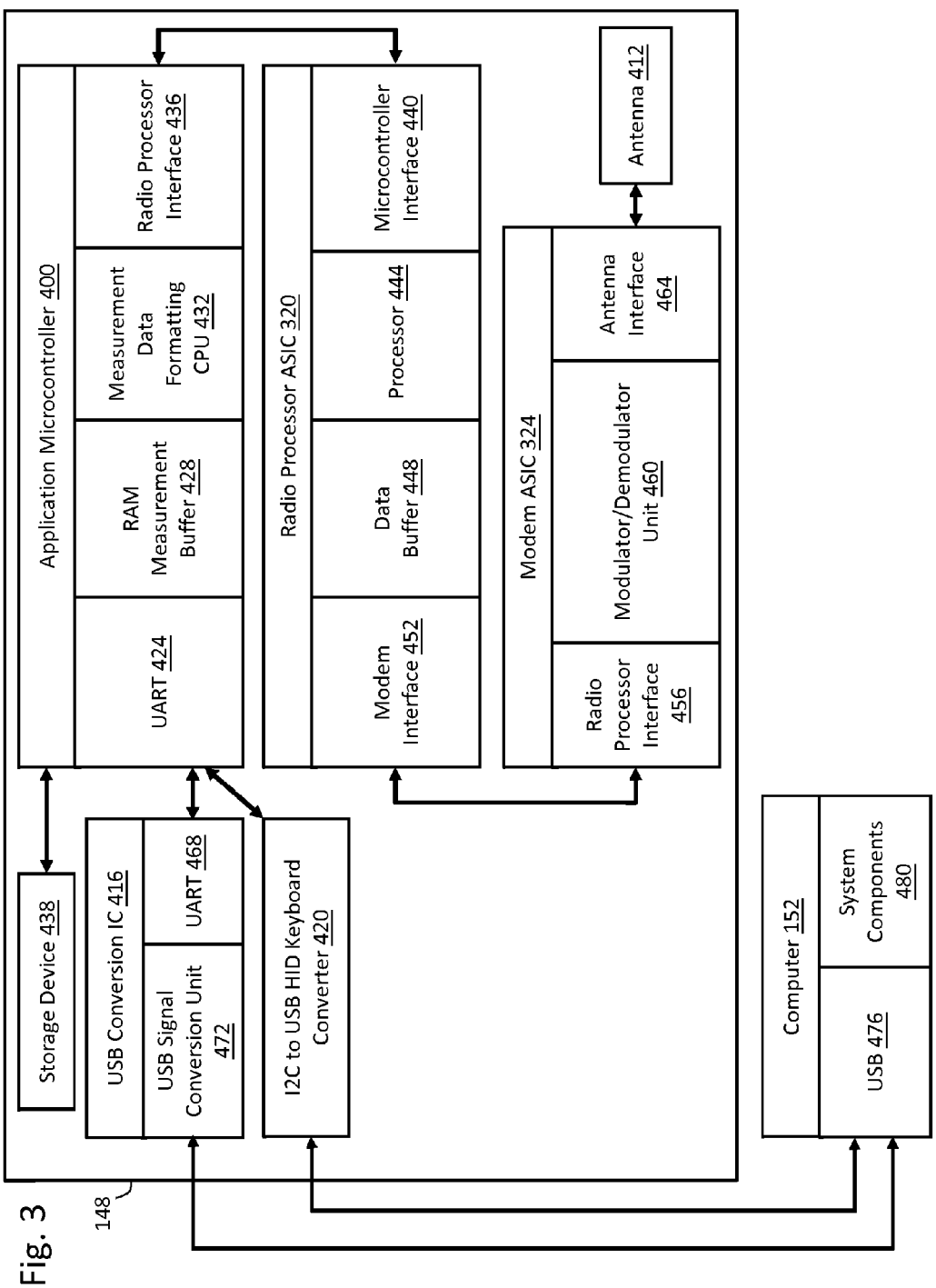
FIG. 3 is a detailed block diagram of an example of a wireless base adapter usable in a base assembly of the system of FIG. 1.

FIG. 3 depicts a more detailed block diagram of wireless base adapter 148. For example, adapter 148 may include an application microcontroller 400, a radio processor ASIC 404, a modem ASIC 408, an antenna 412, a USB conversion integrated circuit (IC) 416, and an inter-integrated circuit (I²C) to USB human interface device (HID) keyboard converter (or microcontroller) 420. Microcontroller 400 may include a universal asynchronous receiver/transmitter (UART) 424, a RAM measurement buffer 428, a CPU 432 for formatting measurement data, and a radio processor interface 436. Adapter 148 may also have a local storage device 438, such as for storing network identifying information or gauge identifying information of gauges included in the local network.

Similar to radio processor ASIC 320 of gauge adapter 120, radio processor ASIC 404 may include a microcontroller interface 440, a processor 444 for encoding/decoding digital wireless packets (or frames), a data buffer 448, and a modem interface 452. Similar to modem ASIC 324 of gauge adapter 120*a*, modem ASIC 408 may include a radio processor interface 456, a modulator/demodulator unit 460, and an antenna interface 464. USB conversion IC 416 may include another UART 468 and a USB signal conversion unit 472.

As shown in FIG. 3, antenna 412 may be coupled to antenna interface 464. Radio processor interface 456 may be coupled to modem interface 452. Microcontroller interface 440 may be coupled to radio processor interface 436. UART 424 of microcontroller 400 may be coupled to UART 468 of USB conversion IC 416, and to converter 420. USB signal conversion unit 472 may be coupled to a USB port 476 (e.g., a first USB port) of computer 152. Similarly, converter 420 may also be coupled to USB port 476 (e.g., a second USB port) of computer 152. USB port 476 may be coupled to one or more system components 480 of computer 152, such as via an input/output bus, for example, for executing and/or operating the wireless-adapter management system.

Figure 4:
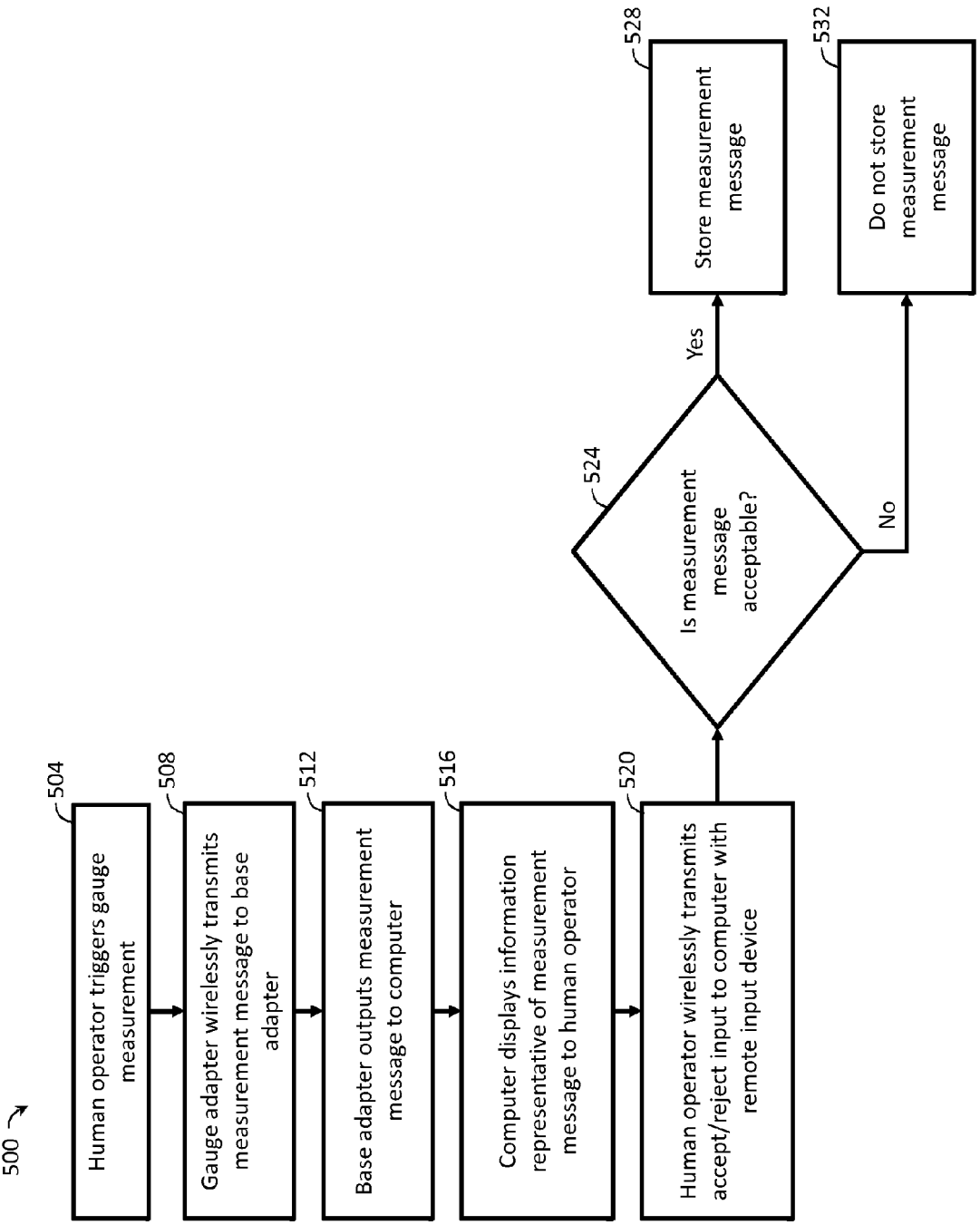
FIG. 4 is a flow chart illustrating an exemplary operation of the system of FIG. 1.

FIG. 4 is a flow chart illustrating exemplary operations performed by (and/or in conjunction with) one embodiment, and may not recite the complete process or all steps of the program. In particular, FIG. 4 depicts multiple steps of a method, generally indicated at 500, which may be performed in conjunction with system 100. For example, aspects of system 100 may be utilized in performance of the method steps described below. Where appropriate, reference may be made to previously described components and systems that may be used in carrying out each step. These references are for illustration, and are not intended to limit the possible ways of carrying out any particular step of the method.

As shown, method 500 may include a step 504 of a human operator triggering a gauge measurement, for example, with gauge 104a. For example, the gauge measurement may correspond to measurement 200 previously described. At step 504, hardware interrupt data buffer 304 (see FIG. 2) may receive measurement 200 (or measurement signal 196) from output 368.

Method 500 may further include a step 508 of the gauge adapter wirelessly transmitting a measurement message (e.g., communication signal 204) to a base adapter (e.g., base adapter 148). For example, at step 508, measurement 200 and/or measurement signal 196 (e.g., and gauge-specific data from metrology storage device 132) may be stored in RAM measurement buffer 308. CPU 312 may format measurement 200 and/or measurement signal 196 (and/or gauge-specific data) to produce communication signal 204. Communication signal 204 may be transmitted from radio processor interface 316 to microcontroller interface 328. Processor 332 may encode communication signal 204 into one or more digital wireless packets (or frames), which may be loaded into data buffer 336, and passed from modem interface 340 to radio processor interface 344. Unit 348 may modulate communication signal 204 (e.g., the one or more digital frames), for example, according to a wireless network protocol, such as a ZigBee network protocol. Antenna interface 352 may output modulated communication signal 204 to antenna 326. Antenna 326 may wirelessly transmit modulated communication signal 204 to base adapter 148.

Method 500 may further include a step 512 of base adapter 148 outputting the measurement message, such as communication signal 204, to computer 152. For example, at step 512, antenna 412 (see FIG. 3) may receive modulated communication signal 204, and may transmit modulated communication signal 204 to unit 460 via interface 464. Unit 460 may demodulate modulated communication signal 204. Demodulated communication signal 204 may be loaded into data buffer 448 via interfaces 456, 452. Processor 444 may decode the one or more digital wireless packets (or frames) of encoded communication signal 240. Decoded communication signal 204 may be passed to CPU 432 via interfaces 440, 436. CPU may format measurement data (e.g., measurement 200) included in decoded communication signal 204 to produce a formatted communication signal 204. Formatted communication signal 204 may be stored in buffer 428 and output via UART 424 to computer 152. For example, UART 424 may output formatted communication signal 240 to USB 476 of computer 152 via one or more of IC 416 (e.g., UART 468 and USB signal conversion unit 472) and converter 420. IC 416 may form a "virtual" COM port for computer 152. Converter 420 may be an I²C interface to another microcontroller (e.g., included in converter 420), which may perform data conversion to a USB HID keyboard input. Such a configuration may permit base adapter 148 to not only send data (e.g., formatted communication signal 204 comprising the measurement message) to the wireless-adapter management software via a traditional COM port, but also input data (e.g., measurements, such as measurement 200) from the gauge network (e.g., comprising gauge adapters 120a-d and gauges 104a-d) into a spreadsheet, text document, or text input box in a similar fashion as a keyboard.

As shown in FIG. 4, method 500 may further include a step 516 of computer 152 displaying information representative of the measurement message to the human operator. For example, at step 516, components 480 of computer 152 may generate display signal 220 (see FIG. 1) based at least in part on formatted communication signal 204, and output display signal to display 192. Display 192 may display the display signal 220, thereby displaying information representative of the measurement message to the human operator. For example, the display of signal 220 on display 192 may involve generating a visual representation of measurement 200 on display 192, which the human operator may view from afar, such as at an opposite end of a stringer.

Method 500 may further include a step 520 of the human operator wirelessly transmitting an accept/reject input to computer 152 with a remote input device, such as wireless feedback device 136 (see FIG. 1). For example, at step 520, the human operator may view measurement 200 on display 192, and operate user-input device 144 to transmit feedback signal 258 from network controller 140 to base adapter 148.

Method 500 may further include a step 524 of determining whether the measurement message is acceptable. For example, at step 524, base adapter 148 may transmit feedback signal 258 to computer 152. Based at least in part on feedback signal 258, computer 152 may determine whether the measurement message (e.g., measurement 200, and/or corresponding communication signal 204) is acceptable. In particular, if feedback signal 258 corresponds to an accept input, then computer 152 may determine that the measurement message is acceptable. However, if feedback signal 258 corresponds to a reject input, then computer 152 may determine that the measurement message is not acceptable. If it is determined that the measurement message is acceptable, then method 500 may proceed to a step 528 of storing the measurement message, for example, on the first storage device. However, if it is determined that the measurement message is not acceptable, then method 500 may proceed to a step 532 of not storing the measurement message. For example, at step 532 the measurement message may be ignored, and/or the human operator may be instructed (e.g., via a message on display 192) to trigger another gauge measurement.

Figure 5:
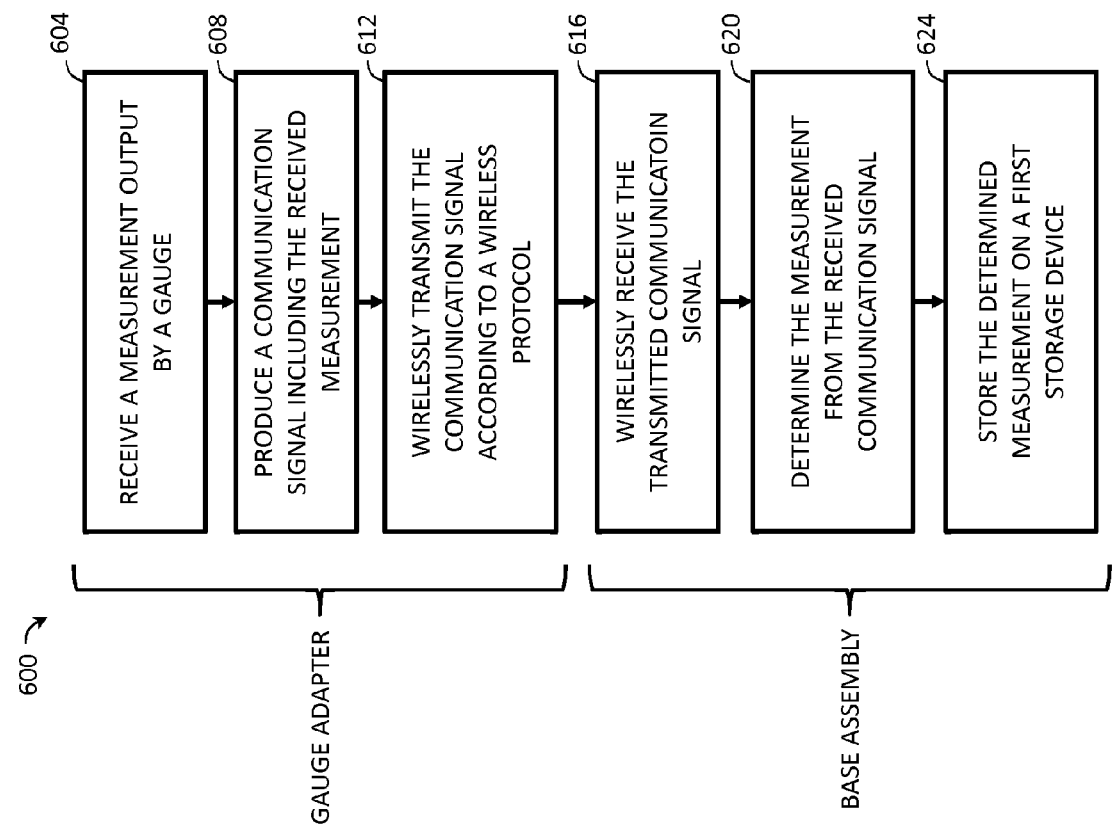
FIG. 5 is a flow chart illustrating exemplary operations performed by the gauge adapter and the base assembly.

FIG. 5 is a flow chart illustrating exemplary operations performed by (and/or in conjunction with) one embodiment, and may not recite the complete process or all steps of the program. In particular, FIG. 5 depicts multiple steps of a method, generally indicated at 600, for communicating a gauge measurement, which may be performed in conjunction with system 100. For example, aspects of system 100 may be utilized in the method steps described below. Where appropriate, reference may be made to previously described components and systems that may be used in carrying out each step. These references are for illustration, and are not intended to limit the possible ways of carrying out any particular step of the method.

As shown, method 600 may include a step 604 of receiving from a gauge (e.g., gauge 104a) a measurement signal (e.g., measurement signal 196) representative of a measurement (e.g., measurement 200) output by the gauge. For example, at step 604, input/output controller 128 may receive measurement signal 196 from gauge 104a. In some embodiments, the gauge may output the measurement signal with the measurement formatted according to a first format of a plurality of formats. For example, gauge 104a may output measurement signal 196 with measurement 200 formatted according to a first format, in which a predetermined number of bits are output by gauge 104a in measurement signal 196 corresponding to measurement 200 in a raw state. In other embodiments, measurement 200 formatted according to the first format may correspond to measurement 200 followed by a carriage return (or other indicator) in measurement signal 196.

Method 600 may further include a step 608 of producing a communication signal (e.g., communication signal 204) including the received measurement. For example, at step 608, input/output controller 128 may produce communication signal 204. In some embodiments, method 600 may further include a step of storing gauge-specific information on a storage device (e.g., storage device 132), such as gauge-type, identification, and/or other gauge-specific metadata described herein. In such embodiments, step 608 may involve producing communication signal 204 with the gauge-specific information (e.g., that is stored on device 132). For example, producing communication signal 204 with the gauge-specific information may involve appending the gauge-specific information to the received measurement.

In some embodiments, method 600 may further include (and/or step 608 may involve) generating the communication signal with the measurement formatted according to a second format of the plurality of formats. For example, the second format may correspond to the gauge-specific information being appended to measurement 200, and/or included in communication signal 204. In some embodiments, the second format may correspond to (and/or be in accordance with) a standardized serial protocol. For example, input/output controller 144 may be configured to perform a bitwise conversion of measurement signal 196 to re-format measurement 200 into the standardized serial protocol.

Method 600 may further include a step 612 of wirelessly transmitting the communication signal according to a wireless protocol. For example, at step 612, network controller 124 of gauge adapter 120a may wirelessly transmit communication signal 204 according to a ZigBee network protocol having an IEEE 802.15.4 wireless communication standard.

Method 600 may further include a step 616 of wirelessly receiving the transmitted communication signal. For example, at step 616, modem ASIC 408 of base adapter 148 may receive communication signal 204 via antenna 412.

Method 600 may further include a step 620 of determining the measurement from the received communication signal. For example, at step 620, communication signal 204 may be processed by modem ASIC 408, radio processor 404, and microcontroller 400, and output to computer 152 via UART 424. System components 480 of computer 152 may determine measurement 200 from received communication signal 204.

Method 600 may further include a step 624 of storing the determined measurement of step 620 on a first storage device, such as the first storage device previously described. In some embodiments, the determined measurement may be stored on the first storage device only if accepted by the user. For example, method 600 may further include a step of receiving a user input corresponding to one or a plurality of inputs, such as buttons 262. The plurality of inputs may be selectable by the user and may relate to the measurement output by the gauge at step 604. More specifically, method 600 may further include a step of outputting by computer 152 to display device 192 display signal 220. As previously described, display signal 220 may be representative of measurement 200 output by gauge 104a. For example, the receiving user input step described above may involve receiving on a wireless feedback device, such as device 136, a user input corresponding to one of the plurality of inputs selectable by the user that relate to measurement 200 displayed on display device 192. In such embodiments, among others, method 600 may further include a step of wirelessly transmitting by the wireless feedback device a feedback signal, such as signal 258, and a step of processing the determined measurement based at least in part on the received feedback signal. For example, if the feedback signal indicates that the user rejects measurement 200, then computer 152 may delete or otherwise ignore measurement 200.

In some embodiments, steps 604, 608, 612 may be performed by a wireless metrology assembly (e.g., assembly 108). For example, wireless metrology assembly 108 may include firmware (e.g., included in one or more of network controller 124 and input/output controller 128) and a second storage device (e.g., metrology storage device 132). In such embodiments, method 600 may further include a step of storing on the second storage device a first configuration for the firmware of wireless metrology assembly 108, and a step of reading on the first storage device (e.g., database 180, and/or another storage device associated with computer 152) a second configuration for the firmware of wireless metrology assembly 108. Method 600 may further include a step of transmitting wirelessly the second configuration for the firmware of wireless metrology assembly 108 to wireless metrology assembly 108, and a step of receiving by wireless metrology assembly 108 the second configuration for the firmware of wireless metrology assembly 108. Method 600 may further include replacing on the second storage device (e.g., storage device 132) the first configuration for the firmware of wireless metrology assembly 108 with the received second configuration for the firmware of wireless metrology assembly 108. Such reconfiguration of firmware may permit for improved data collection from associated gauges of system 100, inclusion of gauge-specific information or data in one or more associated communication signals and/or statistical analysis of collected measurements (and/or related processes).

For example, referring back to FIG. 1, wireless metrology assembly 108 (e.g., gauge adapter 120a) may include firmware that is configurable. The first storage device may store the second configuration, among others, for the firmware of wireless metrology assembly 108 (e.g., of gauge adapter 120a). Computer 152 may be configured to read the second configuration for the firmware of wireless metrology assembly 108 (e.g., of gauge adapter 120a). Computer 152 may be configured to send the second configuration for the firmware of wireless metrology assembly 108 (e.g., of gauge adapter 120a) wirelessly to assembly 108 (e.g., gauge adapter 120a) via base adapter 148. Assembly 108 (e.g., gauge adapter 120a) may be configured to replace the existing first configuration of the firmware with the received second configuration for the firmware. Such a wireless transmission of an updated firmware configuration may permit more efficient reconfiguration of one or more gauge adapters of assembly 108, which for example may allow gauge adapters to be more easily coupled to and wirelessly transmit measurements from different gauges, and/or be interchanged between subsystems.

For example, gauge 104a may output measurement signal 196 with measurement 200 formatted according to the first format of the plurality of formats, as previously described. The first storage device may store a version of the firmware for wireless metrology assembly 108 (e.g., for gauge adapter 120a) for each of the plurality of formats. Computer 152 may be configured to receive an indication from a user that the first format is appropriate for the gauge (e.g., gauge 104a). For example, the wireless-adapter management software application running on computer 152 may be configured to permit the user to input the indication therein. Computer 152 may be configured to read the version of the firmware of assembly 108 (e.g., of gauge adapter 120*a*) for the first format. Computer 152 may be configured to transmit the read version of the firmware (e.g., for the first format) wirelessly to assembly 108 (e.g., gauge adapter 120*a*). Assembly 108 (e.g., gauge adapter 120*a*) may be configured to install the transmitted firmware, for example, to permit gauge adapter 120*a* to convert received measurement signal 196 having measurement 200 in the first format into communication signal 204 having measurement 200 in the second format.

As described above, gauge 104*a* may output measurement signal 196 with measurement 200 formatted according to the first format of the plurality of formats. Accordingly, where steps 604, 608, 612 of method 600 (see FIG. 5) are performed by wireless metrology assembly 108 (e.g., gauge adapter 120*a*) having firmware, method 600 may further include a step of storing a version of the firmware of the wireless metrology assembly for each of the plurality of formats on the first storage device (e.g., on database 180, a storage device of computer 152, and/or a storage device of computer 160). Method 600 may further include a step of receiving an indication from the user that the first format is appropriate for gauge 104*a*. For example, the user may input the indication into the wireless-adapter management software application running on computer 152. In some embodiments, method 600 may further include a step of determining the version of the firmware that provides processing of measurements (e.g., by gauge adapter 104*a*) formatted according to the first format. For example, the determining step may be performed by one or more of the user and computer 152.

Method 600 may further include reading (e.g., by computer 152) the determined version of the firmware from the first storage device. Method 600 may further include wirelessly transmitting the read version of the firmware to wireless metrology assembly (e.g., to gauge adapter 120*a*) via base adapter 148. Method 600 may further include receiving by wireless metrology assembly 108 (e.g., by network controller 124 of gauge adapter 120*a*) the transmitted version of the firmware. Method 600 may further include installing the received version of the firmware on the wireless metrology assembly. For example, method 600 may include gauge adapter 120*a* installing the version of the firmware received by network controller 124, thereby permitting gauge adapter 120*a* to process measurement 200 and transmit corresponding communication signal 204 (e.g., including measurement 200 formatted according to the second format) to base assembly 112.

Figure 7:
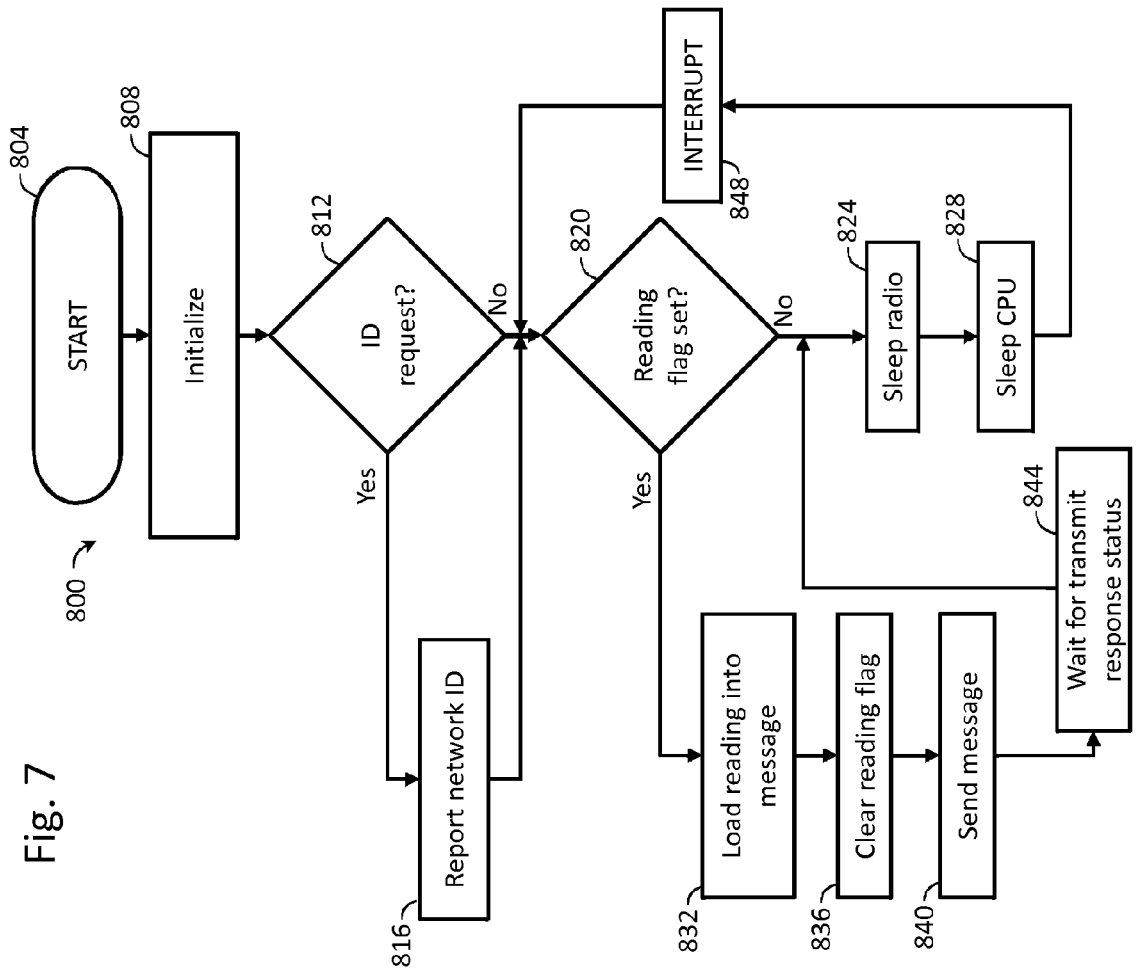
FIGS. 6 and 7 are flow charts illustrating detailed operations performed by one embodiment of the gauge adapter.
Figure 6:
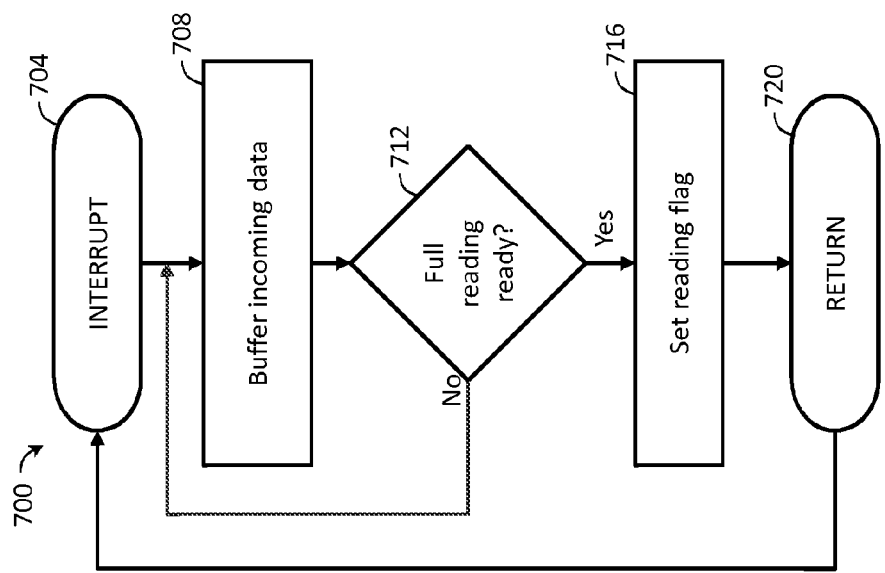
Figure 8:
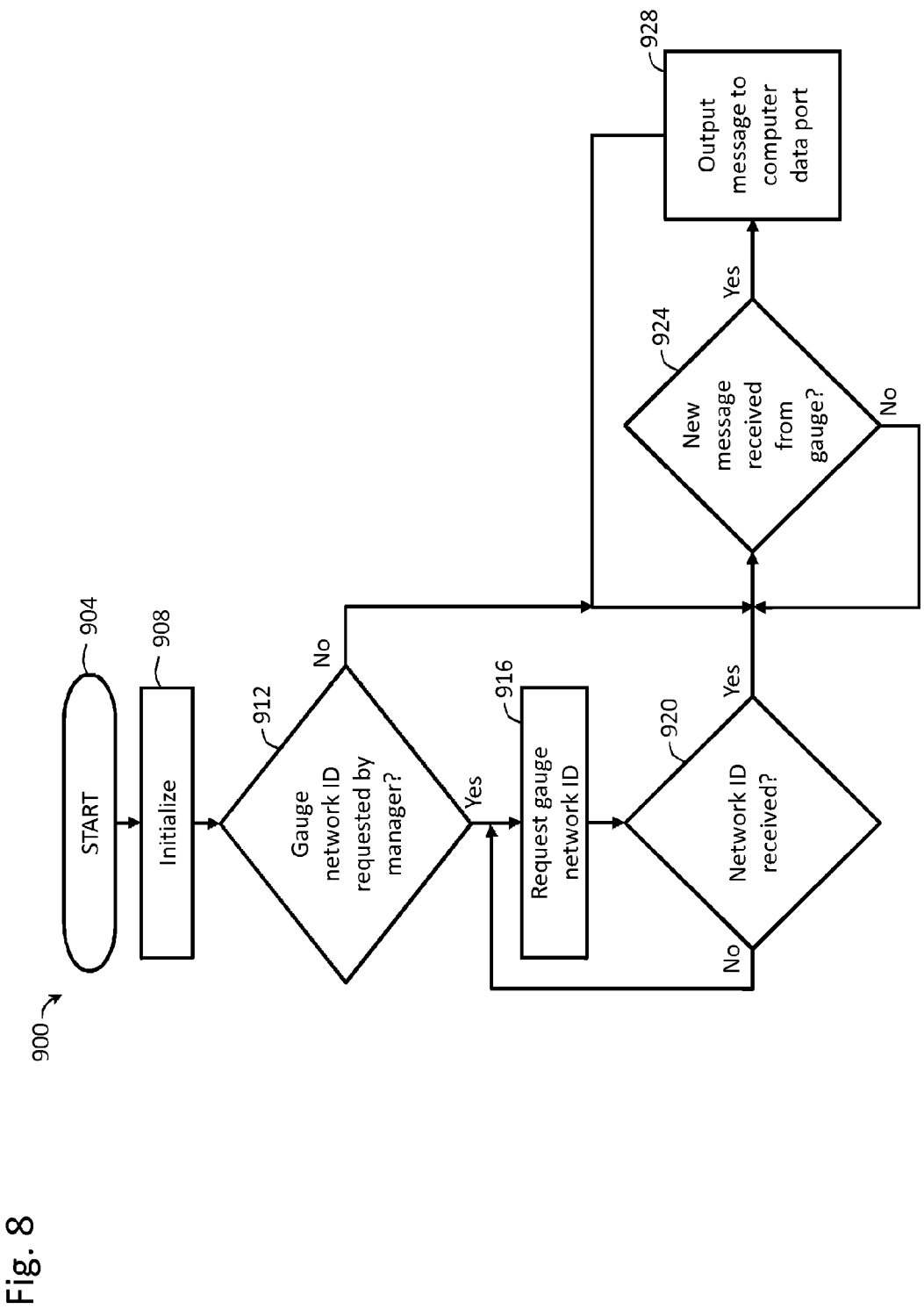
FIG. 8 is a flow chart illustrating detailed operations performed by one embodiment of the wireless base adapter.

More specifically, FIGS. 6 and 7 depict respective detailed operations 700, 800 of one embodiment of wireless metrology assembly 108, and FIG. 8 depicts detailed operations 900 of one embodiment of base adapter 148.

As shown in FIG. 6, operations 700 may include an interrupt step 704, a buffer incoming data step 708, a reading ready determination step 712, a set reading flag step 716, and a return step 720. For example, at step 704, power switch 360 of gauge adapter 120*a* may be in the ON state, and the human operator may trigger a measurement of part 156 with gauge 104*a*, resulting in measurement 200 being output by gauge 104*a* in measurement signal 196. Such an interrupt (or other signal provided to gauge adapter 120*a* by gauge 104*a* and/or the human operator) may awake gauge adapter 120*a* from a sleep mode. Step 704 may proceed to step 708, in which incoming data (e.g., measurement signal 196) is buffered into a storage device, such as metrology storage device 132 and/or RAM measurement buffer 308. Step 708 may proceed to step 712, in which gauge adapter 120*a* may determine whether a full reading is ready. For example, at step 712, input/output controller 128 may determine whether measurement signal 196 has been completely received and/or has been suitably formatted by CPU 312. If it is determined that a full reading is not ready, then operations 700 may return to step 708 and continue a buffering of incoming data. However, if it is determined that a full reading is ready, then operations 700 may proceed to step 716 in which a reading flag may be set. For example, the reading flag may be set in either of network controller 124 and input/output controller 128. Once the reading flag has been set, then operations may proceed to step 720, in which a sleep function of gauge adapter 120*a* may cause one or more of controllers 124, 128 to enter/return to the sleep state, until, for example, a subsequent interrupt step 704 is performed.

As shown in FIG. 7, operations 800 may include a start step 804, an initialize step 808, a network identification (ID) request determination step 812, a report network ID step 816, a reading flag set determination step 820, a sleep radio step 824, a sleep CPU step 828, a load reading into message step 832, a clear reading flag step 836, a send message step 840, a wait for transmit response status step 844, and an interrupt step 848 (e.g., which may correspond to one or more of operations 700).

More specifically, at step 804, the human operator may power on gauge adapter 120*a* by operating switch 360 from the OFF state to the ON state. As a result, operations 800 may proceed to step 808, for example, in which gauge adapter 120*a* may be initialized. Once initialized, operations 800 may proceed to step 812, in which gauge adapter 120*a* may determine whether a network ID of gauge adapter 120*a* has been requested. For example, the human operator may request the network ID of gauge adapter 120*a* by holding down switch 360 in the ON state. If it is determined at step 812 that the network identification of gauge adapter 120*a* has been requested, then operations 800 may proceed to step 816. At step 816, gauge adapter 120*a* may report the network ID of gauge adapter 120*a*, for example, by emitting a light signal (e.g., a predetermined sequence of flashes) from light 364 (or other suitable indicator). The light signal may indicate the network ID of gauge adapter 120*a* to the human operator. The human operator may enter the network ID of gauge adapter 120*a*, for example, into the wireless-adapter management software application running on computer 152 thereby permitting identification of gauge adapter 120*a* by base adapter 148 and/or wireless communication of data there between, as described above.

Once gauge adapter 120*a* has reported its network ID and/or if it is determined at step 812 that the network ID of gauge adapter 120*a* is not currently requested, then operations 800 may proceed to step 820. At step 820, gauge adapter 120*a* (e.g., one or more of microcontroller 300 and ASICs 320, 324) may determine whether the reading flag has been set, for example, at step 716 of operations 700. If it is determined that the reading flag has not been (e.g., is not currently) set, then operations 800 may proceed to step 824, in which one or more of ASICs 320, 324 may enter a sleep mode, and to step 828, in which CPU 312 may enter a sleep mode. However, if it is determined that the reading flag is set (e.g., is currently set), then operations 800 may proceed to step 832. At step 832, microcontroller 300 and/or radio processor ASIC 320 may load measurement signal 196 into a message, such as communication signal 204. After (or while) the measurement signal has been loaded into the message, then operations 832 may proceed to step 836. At step 836, the reading flag set at step 716 may be cleared. Operations 800 may proceed to step 840, in which the message may be sent (e.g., wirelessly to base adapter 148). For example, at step 840, unit 348 may modulate communication signal 204 and wirelessly transmit modulated communication signal 204 to base adapter 148 via antenna 326.

Operations 800 may proceed to step 844, in which gauge adapter 120a may wait for a transmit response status. For example, at step 844, gauge adapter 120a may not enter the sleep mode until gauge adapter 120a has received a transmit response status from base adapter 148 indicating that communication signal 204 was successfully received. In some embodiments, gauge adapter 120a may be configured to re-transmit communication signal 204, if, for example, gauge adapter 120a does not receive a transmit response status from base adapter 148 within a predetermined amount of time (e.g., 3 seconds). Once gauge adapter 120a has received a transmit response status, operations 800 may proceed to steps 824, 828, in which the sleep function of gauge adapter 120a may be configured to transition the associated components of gauge adapter 120a into respective sleep modes, until for example, a subsequent interrupt (e.g., at step 848). As mentioned above, step 848 may include one or more of operations 700, such as steps 704, 708, 712, 716, 720. As shown, once an interrupt at step 848 has been performed (and/or other steps of operations 700), operations 800 may return to step 820, for example, for subsequent wireless transmissions to base adapter 148.

In some embodiments, either of wireless feedback devices 136, 264 may be configured to perform one or more operations similar to one or more of operations 700, 800. For example, device 136 may include a sleep function configured to operate network controller 140 in a sleep mode, until, for example, a user selects one or more of the plurality of inputs of user-input device 144, thereby waking up network controller 140 in a similar interrupt step. Further, network controller 140 may send feedback signal 258 in a step similar to step 840, and then return to the sleep mode, for example in a step similar to step 824.

As shown in FIG. 8, operations 900 of base adapter 148 may include a start step 904, an initialize step 908, a gauge network ID request determination step 912, a request gauge network ID step 916, a network ID received determination step 920, a message received determination step 924, and an output step 928.

More specifically, at step 904 base adapter 148 may be powered-on, for example, by operation of an associated power switch, and/or via a USB connection with computer 152. Once powered-on, operations 900 may proceed to step 908, in which base adapter 148 may be initialized. Once base adapter 148 is initialized, operations 900 may proceed to step 912, in which base adapter 148 may determine whether a gauge network ID (e.g., the network ID of gauge adapter 120a and/or of another gauge adapter) has been requested by a manager, such as the wireless-adapter management software application running on computer 152. For example, the human operator (or another user) operating computer 152 may input into the software application a request for a network ID of a particular gauge adapter (and/or associated gauge type).

If it is determined that a gauge network ID is requested, then operations 900 may proceed to step 916. In some embodiments, at step 916, base adapter 148 may transmit a gauge network ID request to gauge adapter 120a, which may in turn transmit its network ID back to base adapter 916. However, in other embodiments, step 916 may involve the human operator requesting the network ID of gauge adapter 120a directly, for example, by holding down power switch 360, as described above. Step 916 may proceed to step 920, in which it may be determined whether the network ID of gauge adapter 120a was received (e.g., by base adapter 148, and/or by the human operator inputting the network ID of gauge adapter 120a into the software application). If it is determined at step 920 that the network ID was not received, then operations 900 may return to step 916. However, if it is determined at step 920 that the network ID was received, then operations 900 may proceed to step 924. Similarly, if it is determined at step 912 that a gauge network ID was not requested, then step 912 may proceed to step 924.

At step 924, base adapter 148 may determine whether a new message (e.g., communication signal 204) has been received by base adapter 148 from gauge 104a, for example, via a wireless transmission from gauge adapter 120a, such as that of step 840 of operations 800. As shown, if it is determined that a new message has not been received, then step 924 may be repeated. However, if it is determined that a new message has been received, then operations 900 may proceed to step 928. At step 928, base adapter 148 may output the message (e.g., communication signal 204 via UART 424) to a data port of computer 152, such as USB port 476. As shown, operations 900 may return to step 924 for subsequent reception of messages from wireless metrology assembly 108.

Example 2

Figure 9:
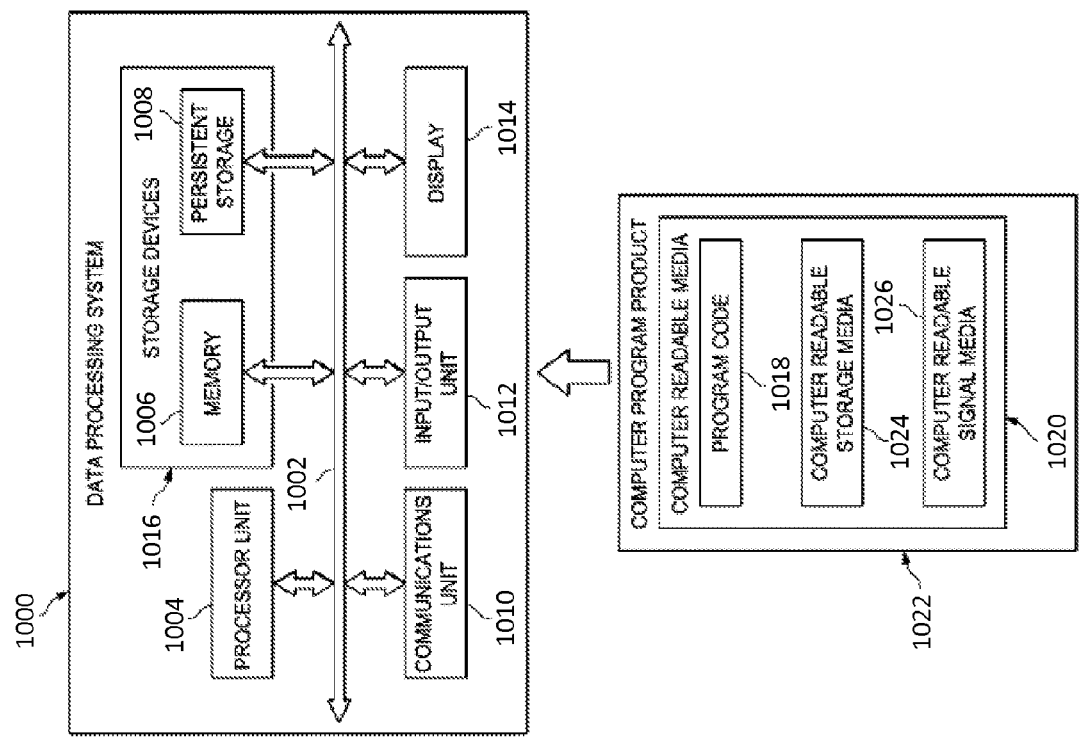
FIG. 9 is a schematic diagram of various components of an illustrative data processing system, one or more of which may be included in the wireless metrology system of FIG. 1.

As shown in FIG. 9, this example describes a data processing system 1000 in accordance with aspects of the present disclosure. In this example, data processing system 1000 is an illustrative data processing system suitable for implementing aspects of one or more of computers 152, 160 of respective subsystems 102, 170, and/or other components of system 100 depicted in FIG. 1. More specifically, in some examples, devices that are embodiments of data processing systems (e.g., smartphones, tablets, personal computers, workstations, and/or hardened laptops) may store and/or execute the wireless-adapter management software described above, as well as perform other functions, such as forwarding on accepted measurements from wireless metrology assembly 108 to database 180 and/or server 184.

In this illustrative example, data processing system 1000 includes communications framework 1002. Communications framework 1002 provides communications between processor unit 1004, memory 1006, persistent storage 1008, communications unit 1010, input/output (I/O) unit 1012, and display 1014. Memory 1006, persistent storage 1008, communications unit 1010, input/output (I/O) unit 1012, and display 1014 are examples of resources accessible by processor unit 1004 via communications framework 1002.

Processor unit 1004 serves to run instructions that may be loaded into memory 1006. Processor unit 1004 may be a number of processors, a multi-processor core, or some other type of processor, depending on the particular implementation. Further, processor unit 1004 may be implemented using a number of heterogeneous processor systems in which a main processor is present with secondary processors on a single chip. As another illustrative example, processor unit 1004 may be a symmetric multi-processor system containing multiple processors of the same type.

Memory 1006 and persistent storage 1008 are examples of storage devices 1016. A storage device is any piece of hardware that is capable of storing information, such as, for example, without limitation, data, program code in functional form, and other suitable information either on a temporary basis or a permanent basis.

Storage devices 1016 also may be referred to as computer-readable storage devices in these examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these examples, provides for communications with other data processing systems or devices. In these examples, communications unit 1010 is a network interface card. Communications unit 1010 may provide communications through the use of either or both physical and wireless communications links.

Input/output (I/O) unit 1012 allows for input and output of data with other devices that may be connected to data processing system 1000. For example, input/output (I/O) unit 1012 may provide a connection for user input through a keyboard, a mouse, and/or some other suitable input device. Further, input/output (I/O) unit 1012 may send output to a printer. Display 1014 provides a mechanism to display information to a user.

Instructions for the operating system, applications, and/or programs may be located in storage devices 1016, which are in communication with processor unit 1004 through communications framework 1002. In these illustrative examples, the instructions are in a functional form on persistent storage 1008. These instructions may be loaded into memory 1006 for execution by processor unit 1004. The processes of the different embodiments may be performed by processor unit 1004 using computer-implemented instructions, which may be located in a memory, such as memory 1006.

These instructions are referred to as program instructions, program code, computer usable program code, or computer-readable program code that may be read and executed by a processor in processor unit 1004. The program code in the different embodiments may be embodied on different physical or computer-readable storage media, such as memory 1006 or persistent storage 1008.

Program code 1018 is located in a functional form on computer-readable media 1020 that is selectively removable and may be loaded onto or transferred to data processing system 1000 for execution by processor unit 1004. Program code 1018 and computer-readable media 1020 form computer program product 1022 in these examples. In one example, computer-readable media 1020 may be computer-readable storage media 1024 or computer-readable signal media 1026.

Computer-readable storage media 1024 may include, for example, an optical or magnetic disk that is inserted or placed into a drive or other device that is part of persistent storage 1008 for transfer onto a storage device, such as a hard drive, that is part of persistent storage 1008. Computer-readable storage media 1024 also may take the form of a persistent storage, such as a hard drive, a thumb drive, or a flash memory, that is connected to data processing system 1000. In some instances, computer-readable storage media 1024 may not be removable from data processing system 1000.

In these examples, computer-readable storage media 1024 is a physical or tangible storage device used to store program code 1018 rather than a medium that propagates or transmits program code 1018. Computer-readable storage media 1024 is also referred to as a computer-readable tangible storage device or a computer-readable physical storage device. In other words, computer-readable storage media 1024 is a media that can be touched by a person.

Alternatively, program code 1018 may be transferred to data processing system 1000 using computer-readable signal media 1026. Computer-readable signal media 1026 may be, for example, a propagated data signal containing program code 1018. For example, computer-readable signal media 1026 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1018 may be downloaded over a network to persistent storage 1008 from another device or data processing system through computer-readable signal media 1026 for use within data processing system 1000. For instance, program code stored in a computer-readable storage medium in a server data processing system may be downloaded over a network from the server to data processing system 1000. The data processing system providing program code 1018 may be a server computer, a client computer, or some other device capable of storing and transmitting program code 1018.

The different components illustrated for data processing system 1000 are not meant to provide architectural limitations to the manner in which different embodiments may be implemented. The different illustrative embodiments may be implemented in a data processing system including components in addition to and/or in place of those illustrated for data processing system 1000. Other components shown in FIG. 9 can be varied from the illustrative examples shown. The different embodiments may be implemented using any hardware device or system capable of running program code. As one example, data processing system 1000 may include organic components integrated with inorganic components and/or may be comprised entirely of organic components excluding a human being. For example, a storage device may be comprised of an organic semiconductor.

In another illustrative example, processor unit 1004 may take the form of a hardware unit that has circuits that are manufactured or configured for a particular use. This type of hardware may perform operations without needing program code to be loaded into a memory from a storage device to be configured to perform the operations.

For example, when processor unit 1004 takes the form of a hardware unit, processor unit 1004 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 1018 may be omitted, because the processes for the different embodiments are implemented in a hardware unit.

In still another illustrative example, processor unit 1004 may be implemented using a combination of processors found in computers and hardware units. Processor unit 1004 may have a number of hardware units and a number of processors that are configured to run program code 1018. With this depicted example, some of the processes may be implemented in the number of hardware units, while other processes may be implemented in the number of processors.

In another example, a bus system may be used to implement communications framework 1002 and may be comprised of one or more buses, such as a system bus or an input/output bus. Of course, the bus system may be implemented using any suitable type of architecture that provides for a transfer of data between different components or devices attached to the bus system.

Additionally, communications unit 1010 may include a number of devices that transmit data, receive data, or both transmit and receive data. Communications unit 1010 may be, for example, a modem or a network adapter, two network adapters, or some combination thereof. Further, a memory may be, for example, memory 1006, or a cache, such as that found in an interface and memory controller hub that may be present in communications framework 1002.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Example 3

This section describes additional aspects and features of embodiments presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. A method of communicating a gauge measurement comprising: receiving from a gauge a measurement signal representative of a measurement output by the gauge; producing a communication signal including the received measurement; and wirelessly transmitting the communication signal according to a wireless network protocol.

A2. The method of paragraph A1, wherein wirelessly transmitting the communication signal includes wirelessly transmitting the communication signal according to a ZigBee network protocol having an IEEE 802.15.4 wireless communication standard.

A3. The method of paragraph A1, further comprising storing gauge-specific information on a storage device, and wherein producing a communication signal includes producing the communication signal with the gauge-specific information.

A4. The method of paragraph A1, where the gauge outputs the measurement signal with the measurement formatted according to a first format of a plurality of formats, the method further comprising generating the communication signal with the measurement formatted according to a second format of the plurality of formats.

A5. The method of paragraph A1, further comprising receiving a user input corresponding to one of a plurality of inputs selectable by the user that relate to the measurement output by the gauge, and wirelessly transmitting a feedback signal representative of the user input.

A6. The method of paragraph A1, further comprising wirelessly receiving the transmitted communication signal, determining the measurement from the received communication signal, and storing the determined measurement on a first storage device.

A7. The method of paragraph A6, where receiving from a gauge a measurement signal, producing a communication signal, and wirelessly transmitting the communication signal are performed by a wireless metrology assembly having firmware and a second storage device, the method further comprising storing on the second storage device a first configuration for the firmware of the wireless metrology assembly, reading on the first storage device a second configuration for the firmware of the wireless metrology assembly, transmitting the second configuration for the firmware of the wireless metrology assembly wirelessly to the wireless metrology assembly, receiving by the wireless metrology assembly the second configuration for the firmware of the wireless metrology assembly, and replacing on the second storage device the first configuration for the firmware of the wireless metrology assembly with the received second configuration for the firmware of the wireless metrology assembly.

A8. The method of paragraph A6, where the gauge outputs the measurement signal with the measurement formatted according to a first format of a plurality of formats, and receiving a measurement signal from the gauge, producing a communication signal, and wirelessly transmitting the communication signal are performed by a wireless metrology assembly having firmware; the method further comprising storing a version of the firmware of the wireless metrology assembly for each of the plurality of formats on the first storage device, receiving an indication from a user that the first format is appropriate for the gauge, determining the version of firmware that provides processing of measurements formatted according to the first format, reading the determined version of the firmware from the first storage device, and transmitting the read version of the firmware wirelessly to the wireless metrology assembly, receiving by the wireless metrology assembly the transmitted version of the firmware, and installing the received version of the firmware on the wireless metrology assembly.

A9. The method of paragraph A6, further comprising outputting by a computer to a display device a display signal representative of a measurement output by the gauge, receiving, on a wireless feedback device physically and operatively separate from and independently movable relative to the gauge and relative to the computer, a user input corresponding to one of a plurality of inputs selectable by the user that relate to the measurement displayed on the display device, wirelessly transmitting by the wireless feedback device a feedback signal representative of the user input, receiving the transmitted feedback signal, and processing the determined measurement based at least in part on the received feedback signal.

B1. A wireless metrology assembly comprising an input/output controller and a first wireless network controller operatively coupled to the input/output controller, the input/output controller configured to receive from a gauge when the wireless metrology assembly is operatively coupled to the gauge, a measurement signal representative of a measurement output by the gauge, and to produce a communication signal including the received measurement, and the first wireless network controller being configured to wirelessly transmit the communication signal according to a wireless network protocol.

B2. The wireless metrology assembly of paragraph B1, where the wireless network protocol is a ZigBee network protocol according to an IEEE 802.15.4 wireless communication standard.

B3. The wireless metrology assembly of paragraph B1, further comprising a metrology storage device configured to store one or more gauge-specific data, and the input/output controller is configured to produce the communication signal with at least one of the one or more gauge-specific data.

B4. The wireless metrology assembly of paragraph B1, where the gauge outputs the measurement signal with the measurement formatted according to a first format of a plurality of formats, the input/output controller being configured to generate the communication signal with the measurement formatted according to a second format of the plurality of formats.

B5. The wireless metrology assembly of paragraph B1, wherein the wireless metrology assembly is configured to receive a user input corresponding to one of a plurality of inputs selectable by the user that relate to the measurement output by the gauge, and to wirelessly transmit a feedback signal representative of the user input.

B6. A wireless metrology system comprising: the wireless metrology assembly of paragraph B1; a storage device; a wireless base adapter configured to wirelessly receive the transmitted communication signal; and a computer configured to receive the communication signal from the wireless base adapter, determine the measurement from the communication signal, and to store the determined measurement on the storage device.

B7. The wireless metrology system of paragraph B6, wherein the wireless metrology assembly includes firmware that is configurable, the storage device also stores a first configuration for the firmware of the wireless metrology assembly, the computer is configured to read the first configuration for the firmware of the wireless metrology assembly and to send the first configuration for the firmware of the wireless metrology assembly wirelessly to the wireless metrology assembly via the wireless base adapter, and the wireless metrology assembly is configured to replace an existing second firmware configuration with the received first configuration for the firmware.

B8. The wireless metrology system of paragraph B6, where the gauge outputs the measurement signal with the measurement formatted according to a first format of a plurality of formats, and wherein the wireless metrology assembly includes firmware, the storage device also stores a version of the firmware of the wireless metrology assembly for each of the plurality of formats, the computer is configured to receive an indication from a user that the first format is appropriate for the gauge, to read the version of the firmware of the wireless metrology assembly for the first format, and to transmit the read version of the firmware wirelessly to the wireless metrology assembly via the wireless base adapter, and the wireless metrology assembly is configured to install the transmitted firmware of the wireless metrology assembly.

B9. The wireless metrology system of paragraph B6, further comprising a display device operatively coupled to the computer and configured to display a display signal received from the computer, the computer being configured to output to the display device a display signal representative of a measurement output by the gauge, and wherein the wireless metrology assembly includes a gauge adapter including a first housing supporting the input/output controller and the first wireless network controller, the wireless metrology assembly further including a wireless feedback device including a second housing physically separate from and independently movable relative to the first housing, a user-input device supported by the second housing, and a second wireless network controller also supported by the second housing, the user-input device being configured to receive a user input corresponding to one of a plurality of inputs selectable by the user that relate to the measurement displayed on the display device, and the second wireless network controller being configured to wirelessly transmit a feedback signal representative of the user input to the computer via the wireless base adapter.

C1. A wireless metrology system comprising: a wireless metrology assembly having at least one input device configured to receive an indication relating to a measurement, the indication being manually entered on the input device and corresponding to at least one of a plurality of inputs selectable by a user, the wireless metrology assembly being configured to receive from a gauge when the wireless metrology assembly is operatively coupled to the gauge a measurement signal representative of a measurement output by the gauge, to wirelessly transmit a communication signal representative of the measurement signal, and to wirelessly transmit a feedback signal representative of the entered indication; a display device configured to display a display signal; and a base assembly configured to wirelessly receive the transmitted communication signal, to communicate to the display device the display signal including an indication of the measurement output by the gauge, and to wirelessly receive the feedback signal.

C2. The wireless metrology system of paragraph C1, wherein the wireless metrology assembly includes a gauge adapter and a wireless feedback device physically separate from and independently movable relative to the gauge adapter, the gauge adapter being configured to receive from the gauge when the gauge adapter is operatively coupled to the gauge the measurement signal, and to wirelessly transmit the communication signal, the wireless feedback device including the input device and being configured to receive a user input corresponding to one of a plurality of inputs selectable by the user that relate to the measurement displayed on the display device, and to wirelessly transmit a feedback signal representative of the user input to the base assembly.

Advantages, Features, Benefits

The different embodiments described herein provide several advantages over known solutions for collecting gauge measurements. For example, the illustrative embodiments described herein allow for gauge measurements to be wirelessly and securely transmitted, regardless of a native protocol (e.g., output format) of the gauge. Additionally, and among other benefits, illustrative embodiments described herein allow a wirelessly transmitted gauge measurement to be remotely accepted or rejected. Illustrative embodiments described herein also provide for wireless communication from a base station to a gauge adapter and associated gauge, which communication may be used to update gauge adapter firmware or to reconfigure a gauge adapter. However, not all embodiments described herein provide the same advantages or the same degree of advantage.

Conclusion

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

What is claimed is:

1. A method of communicating a gauge measurement comprising:
   receiving from a gauge a measurement signal representative of a measurement output by the gauge by a wireless metrology assembly when the wireless metrology assembly is operatively coupled to the gauge;
   producing from the received measurement signal, by the wireless metrology assembly, a communication signal representative of the measurement; and
   wirelessly transmitting, by the wireless metrology assembly, the communication signal according to a wireless network protocol.

2. The method of claim 1, wherein wirelessly transmitting the communication signal includes wirelessly transmitting the communication signal according to a ZigBee network protocol.

3. The method of claim 1, further comprising storing a gauge-specific information on a storage device, and wherein producing the communication signal includes producing the communication signal with the gauge-specific information.

4. The method of claim 1, wherein the gauge outputs the measurement formatted according to a first format of a plurality of formats, and producing the communication signal includes producing the communication signal with the measurement formatted according to a second format of the plurality of formats.

5. The method of claim 1, further comprising receiving a user input corresponding to one of a plurality of inputs selectable by the user that relate to the measurement output by the gauge, and wirelessly transmitting a feedback signal representative of the user input.

6. The method of claim 1, further comprising wirelessly receiving the transmitted communication signal, determining the measurement from the received communication signal, and storing the determined measurement on a first storage device.

7. The method of claim 6, wherein the wireless metrology assembly has firmware and a second storage device, the method further comprising storing on the second storage device a first configuration for the firmware of the wireless metrology assembly, reading on the first storage device a second configuration for the firmware of the wireless metrology assembly, transmitting the second configuration for the firmware of the wireless metrology assembly wirelessly to the wireless metrology assembly, receiving by the wireless metrology assembly the second configuration for the firmware of the wireless metrology assembly, and replacing on the second storage device the first configuration for the firmware of the wireless metrology assembly with the received second configuration for the firmware of the wireless metrology assembly.

8. The method of claim 6, wherein the gauge outputs the measurement formatted according to a first format of a plurality of formats, and the wireless metrology assembly has firmware; the method further comprising storing a version of the firmware of the wireless metrology assembly for each of the plurality of formats on the first storage device, receiving an indication from a user that the first format is appropriate for the gauge, determining the version of firmware that provides processing of measurements formatted according to the first format, reading the determined version of the firmware from the first storage device, and transmitting the read version of the firmware wirelessly to the wireless metrology assembly, receiving by the wireless metrology assembly the transmitted version of the firmware, and installing the received version of the firmware on the wireless metrology assembly.

9. A method of communicating a gauge measurement comprising:
   receiving from a gauge a measurement signal representative of a measurement output by the gauge;
   producing a communication signal representative of the measurement;
   wirelessly transmitting the communication signal according to a wireless network protocol;
   wirelessly receiving the transmitted communication signal;
   determining the measurement from the received communication signal;
   storing the determined measurement on a first storage device;
   outputting by a computer to a display device a display signal representative of the measurement output by the gauge;
   receiving, on a wireless feedback device physically and operatively separate from and independently movable relative to the gauge and relative to the computer, a user input corresponding to one of a plurality of inputs selectable by the user that relate to the measurement displayed on the display device;
   wirelessly transmitting by the wireless feedback device a feedback signal representative of the user input;
   receiving the transmitted feedback signal; and
   processing the determined measurement based at least in part on the received feedback signal.

10. The method of claim 1, wherein the wireless metrology assembly includes an input/output controller and a wireless network controller operatively coupled to the input/output controller, the input/output controller receives the measurement signal and produces the communication signal, and the wireless network controller wirelessly transmits the communication signal.

11. A wireless metrology assembly comprising an input/output controller and a first wireless network controller operatively coupled to the input/output controller, the input/output controller configured to receive from a gauge when the wireless metrology assembly is operatively coupled to the gauge, a measurement signal representative of a measurement output by the gauge, and to produce a communication signal representative of the measurement, and the first wireless network controller being configured to wirelessly transmit the communication signal according to a wireless network protocol.

12. The wireless metrology assembly of claim 11, wherein the wireless network protocol is a ZigBee network protocol.

13. The wireless metrology assembly of claim 11, further comprising a metrology storage device configured to store one or more gauge-specific data, and the input/output controller is configured to produce the communication signal with at least one of the one or more gauge-specific data.

14. The wireless metrology assembly of claim 11, wherein the gauge outputs the measurement formatted according to a first format of a plurality of formats, the input/output controller being configured to produce the communication signal with the measurement formatted according to a second format of the plurality of formats.

15. The wireless metrology assembly of claim 11, wherein the wireless metrology assembly is configured to receive a user input corresponding to one of a plurality of inputs selectable by the user that relate to the measurement output by the gauge, and to wirelessly transmit a feedback signal representative of the user input.

16. A wireless metrology system comprising:
the wireless metrology assembly of claim 11;
a storage device;
a wireless base adapter configured to wirelessly receive the transmitted communication signal; and
a computer configured to receive the communication signal from the wireless base adapter, determine the measurement from the communication signal, and to store the determined measurement on the storage device.

17. The wireless metrology system of claim 16, wherein the wireless metrology assembly includes firmware that is configurable, the storage device also stores a first configuration for the firmware of the wireless metrology assembly, the computer is configured to read the first configuration for the firmware of the wireless metrology assembly and to send the first configuration for the firmware of the wireless metrology assembly wirelessly to the wireless metrology assembly via the wireless base adapter, and the wireless metrology assembly is configured to replace an existing second firmware configuration with the received first configuration for the firmware.

18. The wireless metrology system of claim 16, wherein the gauge outputs the measurement signal with the measurement formatted according to a first format of a plurality of formats, and wherein the wireless metrology assembly includes firmware, the storage device also stores a version of the firmware of the wireless metrology assembly for each of the plurality of formats, the computer is configured to receive an indication from a user that the first format is appropriate for the gauge, to read the version of the firmware of the wireless metrology assembly for the first format, and to transmit the read version of the firmware wirelessly to the wireless metrology assembly via the wireless base adapter, and the wireless metrology assembly is configured to install the transmitted firmware of the wireless metrology assembly.

19. The wireless metrology system of claim 16, further comprising a display device operatively coupled to the computer and configured to display a display signal received from the computer, the computer being configured to output to the display device the display signal representative of a measurement output by the gauge, and wherein the wireless metrology assembly includes a gauge adapter including a first housing supporting the input/output controller and the first wireless network controller, the wireless metrology assembly further including a wireless feedback device including a second housing physically separate from and independently movable relative to the first housing, a user-input device supported by the second housing, and a second wireless network controller also supported by the second housing, the user-input device being configured to receive a user input corresponding to one of a plurality of inputs selectable by the user that relate to the measurement displayed on the display device, and the second wireless network controller being configured to wirelessly transmit a feedback signal representative of the user input to the computer via the wireless base adapter.

20. A wireless metrology system comprising:
a wireless metrology assembly having at least one input device configured to receive an indication relating to a measurement, the indication being manually entered on the at least one input device and corresponding to at least one of a plurality of inputs selectable by a user, the wireless metrology assembly being configured to receive from a gauge when the wireless metrology assembly is operatively coupled to the gauge a measurement signal representative of a measurement output by the gauge, to wirelessly transmit a communication signal representative of the measurement signal, and to wirelessly transmit a feedback signal representative of the entered indication;
a display device configured to display a display signal; and
a base assembly configured to wirelessly receive the transmitted communication signal, to communicate to the display device the display signal including an indication of the measurement output by the gauge, and to wirelessly receive the feedback signal.

21. The wireless metrology system of claim 20, wherein the wireless metrology assembly includes a gauge adapter and a wireless feedback device physically separate from and independently movable relative to the gauge adapter, the gauge adapter being configured to receive from the gauge when the gauge adapter is operatively coupled to the gauge the measurement signal, and to wirelessly transmit the communication signal, the wireless feedback device including the input device and being configured to receive a user input corresponding to one of a plurality of inputs selectable by the user that relate to the measurement displayed on the display device, and to wirelessly transmit the feedback signal representative of the user input to the base assembly.

* * * * *